Figure 1:
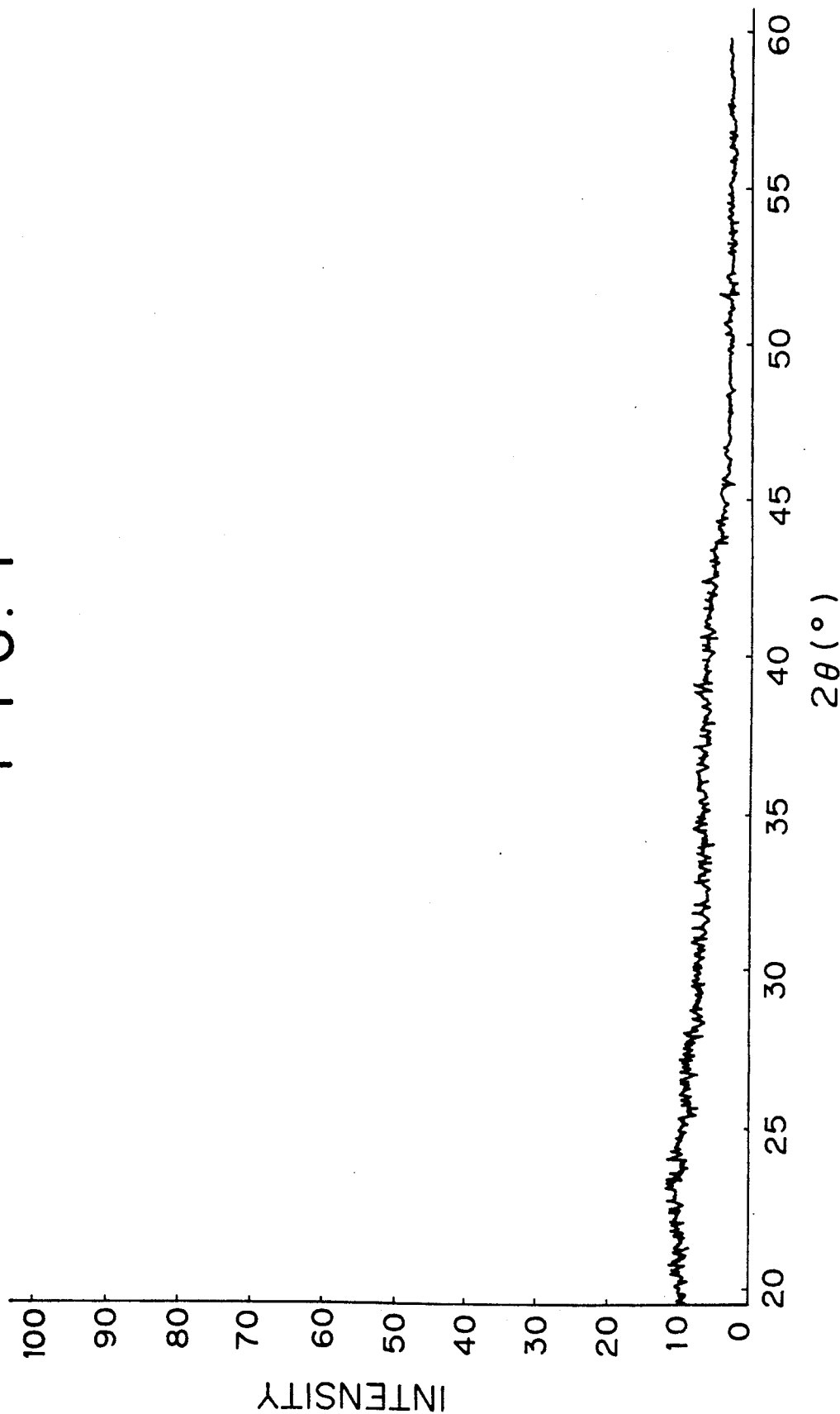

United States Patent [19]

Funayama et al.

[11] Patent Number: 5,030,744

[45] Date of Patent: Jul. 9, 1991

[54] POLYBOROSILAZANE AND PROCESS FOR PRODUCING SAME

[75] Inventors: Osamu Funayama; Mikiro Arai; Yuuji Tashiro, all of Iruma; Takeshi Isoda, Niiza; Kiyoshi Sato, Kamifukuoka, all of Japan

[73] Assignee: Tonen Corporation, Japan

[21] Appl. No.: 466,962

[22] Filed: Jan. 18, 1990

[30] Foreign Application Priority Data

Mar. 23, 1989 [JP] Japan .................................. 1-69169

[51] Int. Cl.$^5$ ........................... C07F 5/02; C07F 5/05; C07F 7/08; C08G 77/06
[52] U.S. Cl. .................................. 556/402; 556/403; 528/12; 528/30
[58] Field of Search .................. 556/402, 403; 528/12, 528/30

[56] References Cited

U.S. PATENT DOCUMENTS 4,581,968 4/1986 Paciorek et al. .................... 556/403
4,707,556 11/1987 Paciorek et al. .................... 556/403
4,906,763 3/1990 Paciorek et al. .................... 556/403

Primary Examiner—Paul F. Shaver
Attorney, Agent, or Firm—Lorusso & Loud

[57] ABSTRACT

Disclosed is a polyborosilazane having a B/Si atomic ratio of 0.01 to 3 and a number-average molecular weight of about 200 to about 500,000 which can be pyrolyzed to give ceramics. The polyborosilazane is produced by reacting a polysilazane having a number-average molecular weight of about 100 to about 50,000 with a boron compound.

5 Claims, 5 Drawing Sheets

POLYBOROSILAZANE AND PROCESS FOR PRODUCING SAME

This invention relates to a novel polyborosilazane and a process for its production.

Si—N—B series ceramics produced from a precursor polyborosilazane are useful as reinforcing materials for composite materials to be used at elevated temperatures because of the high heat resistance and high hardness thereof, and are expected to find wide applications in the space-aircraft industry and the automobile industry.

Many reports have been made on borosiloxane, organoborosilane and boron-containing carbosilane obtained by the reaction between a boron compound such as boric acid (including derivative thereof), a metal borate or a boron halogenide and an organosilicon compound. The reported organosilicon compounds have a low molecular weight, i.e., at most oligomer degree (Japanese Examined Patent Publication No. 57-26608).

Various reports have been made also on polysilazane such as perhydropolysilazane and polyorgano(hydro)-silazane. However, boron-containing polyborosilazane has not conventionally been known.

The present invention is aimed at the provision of polyborosilazane offering ceramics having a marked heat resistance by pyrolysis and a process for producing same.

In accordance with the present invention there is provided a polyborosilazane having a boron/silicon atomic ratio of 0.01 to 3 and a number-average molecular weight of about 200 to 500,000 and containing (a) skeletal groups of a recurring unit represented by the general formula:

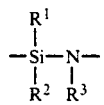

wherein $R^1$, $R^2$ and $R^3$, independently from each other, represent hydrogen, a hydrocarbyl group, a group other than the hydrocarbyl group and containing a carbon atom bonded to the silicon atom of the above general formula, an alkylsilyl group, an alkylamino group or an alkoxy group, with the proviso that at least one of $R^1$, $R^2$ and $R^3$ is hydrogen and (b) at least one cross-linkage which cross-links said skeletal groups and which is selected from the group consisting of:

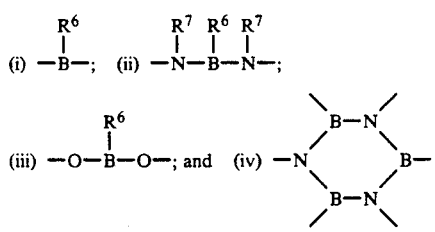

wherein $R^6$ represents hydrogen, halogen, an alkyl group, an alkenyl group, a cycloalkyl group, an aryl group, an alkoxy group, an alkylamino group, a hydroxyl group or an amino group and $R^7$, represents a residue bound to the nitrogen atom of $R^6$ having a nitrogen atom, and wherein at least two of the six bonds of the group (iv) are used for the crosslinkage with the remaining bond or bonds, if any, being linked to hydrogen, halogen, an alkyl group, an alkenyl group, a cycloalkyl group, an aryl group, an alkoxy group, an alkylamino group, a hydroxyl group or an amino group.

In another aspect, the present invention provides a process for producing a polyborosilazane having a boron/silicon atomic ratio of 0.01 to 3 and a number-average molecular weight of about 200 to 500,000, which comprises reacting a polysilazane having a number-average molecular weight of about 100 to about 50,000 and containing a skeletal structure of a recurring unit represented by the general formula (I):

wherein $R^1$, $R^2$ and $R^3$, independently from each other, represent hydrogen, a hydrocarbyl group, a group other than the hydrocarbyl group and containing a carbon atom bonded to the silicon atom of the above general formula, an alkylsilyl group, an alkylamino group or an alkoxy group, with the proviso that at least one of $R^1$, $R^2$ and $R^3$ is hydrogen, with a boron compound represented by the following general formula (II), (III), (IV) or (V):

wherein $R^4$ may be the same or different and represents hydrogen, halogen, an alkyl group, an alkenyl group, a cycloalkyl group, an aryl group, an alkoxy group, an alkylamino group, a hydroxy group or an amino group, and L represents a compound capable of forming a complex with $B(R^4)_3$.

Figure 2:
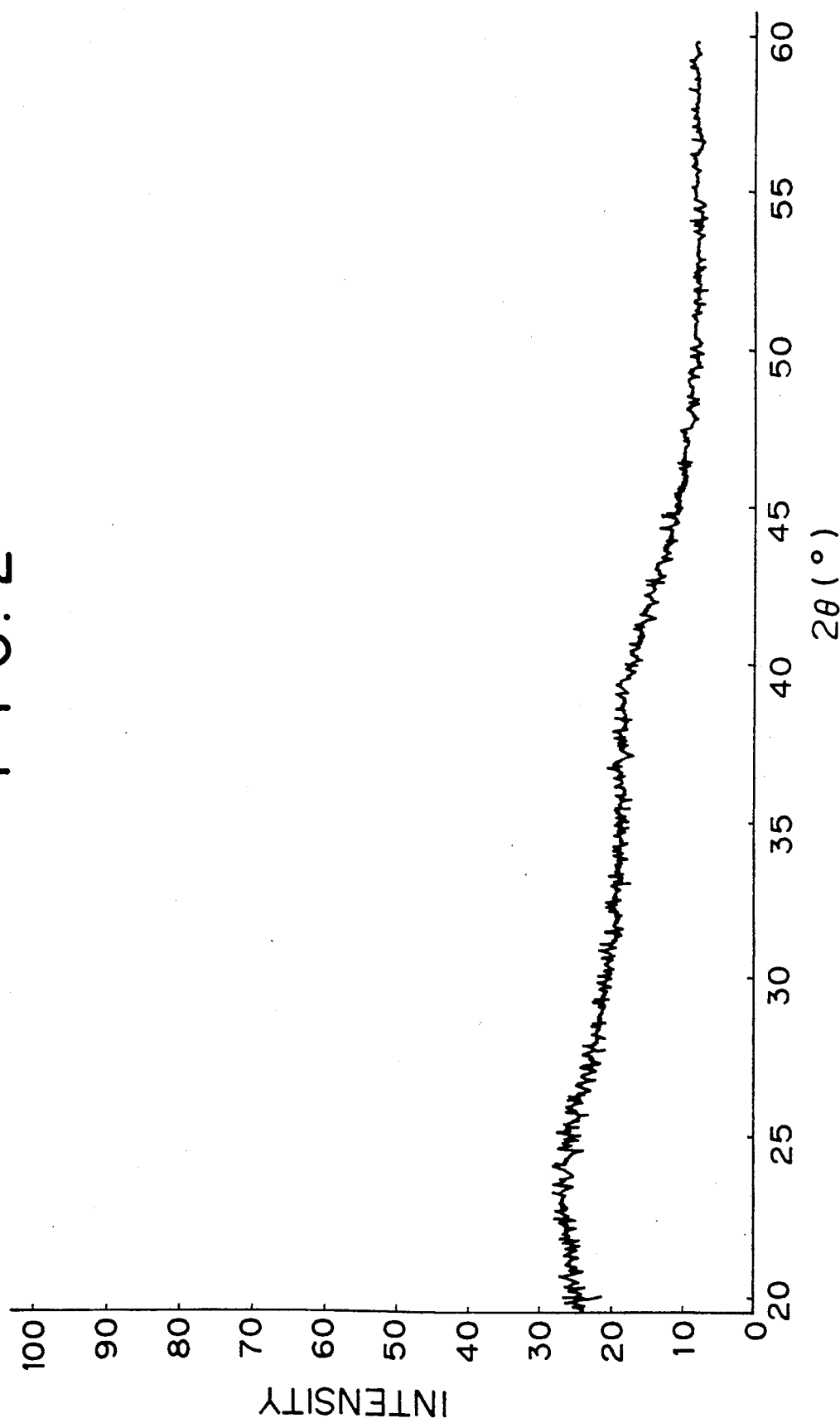
Figure 3:
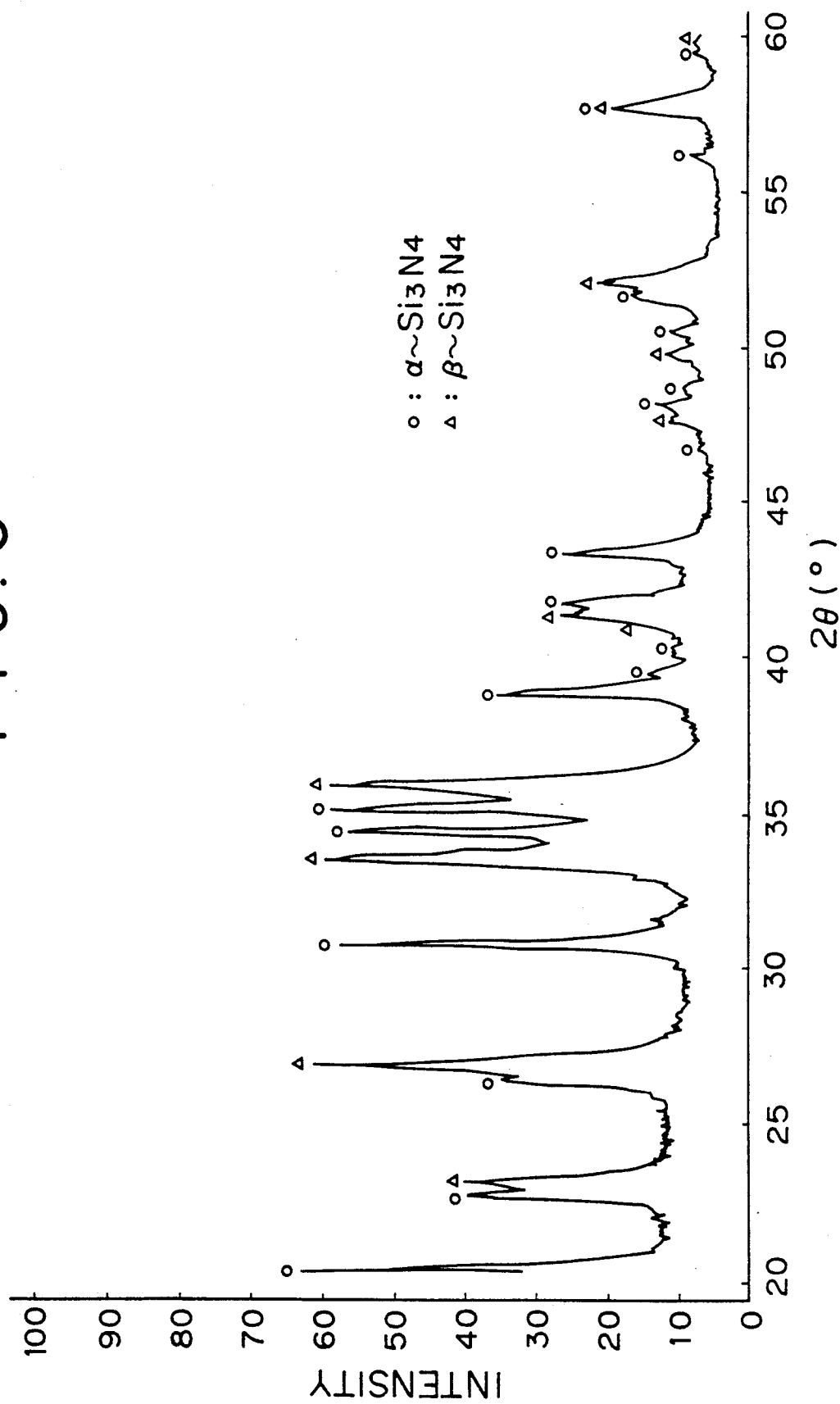
Figure 4:
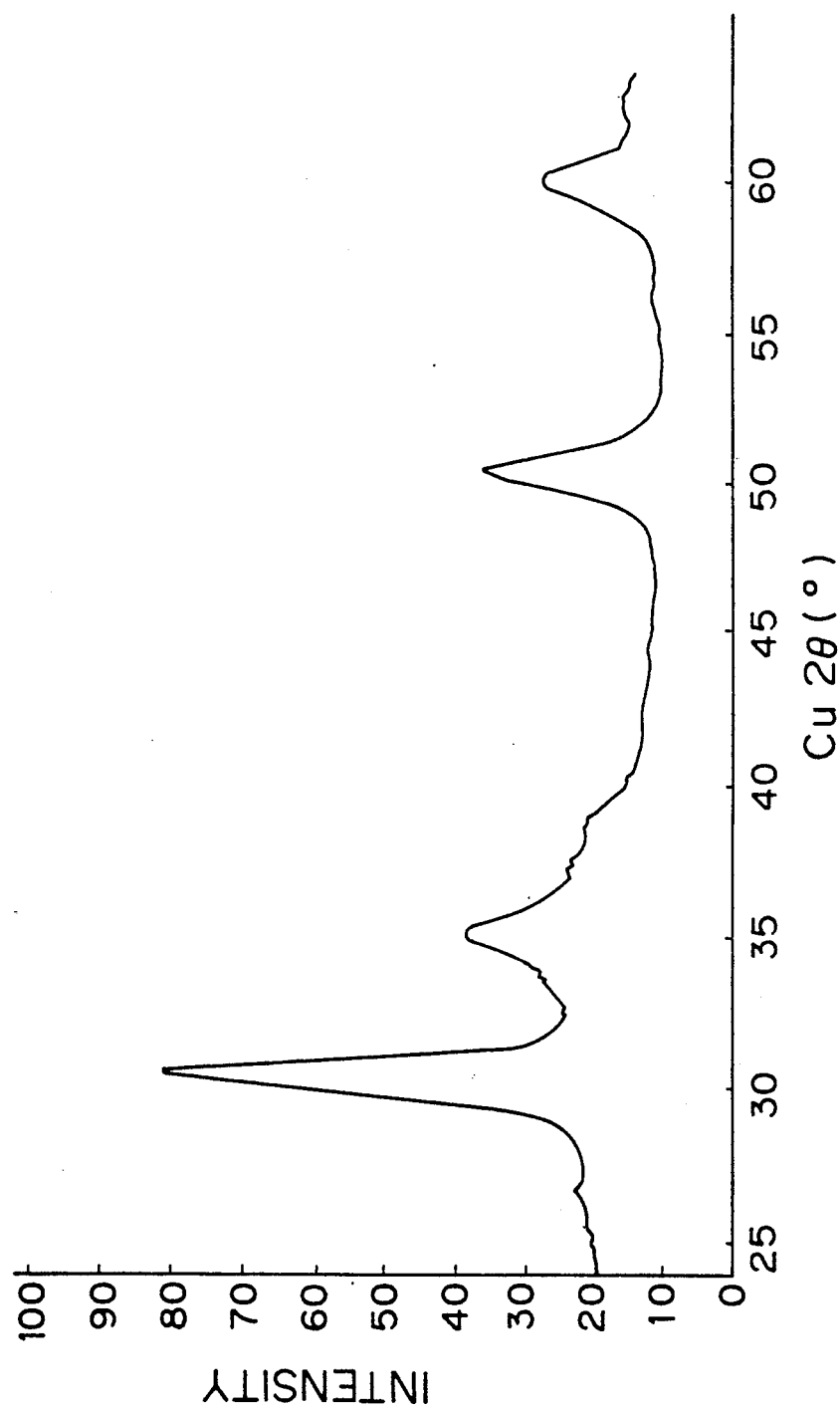
Figure 5:
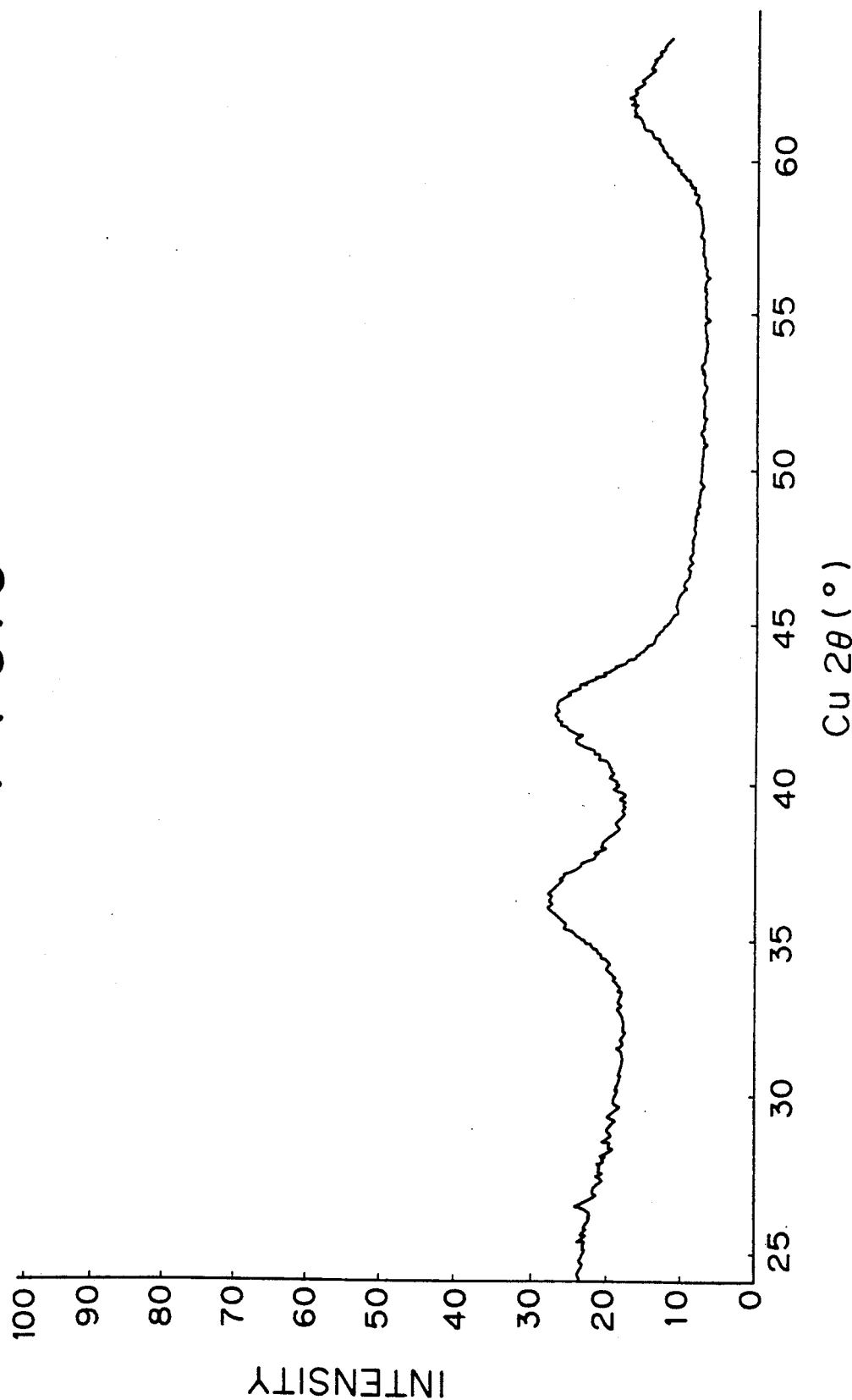

The present invention will now be described in detail below with reference to the accompanying drawing, in which FIGS. 1 to 3 are X-ray diffraction patterns of ceramics obtained by pyrolysis of polyborosilazanes, and FIGS. 4 and 5 are X-ray diffraction patterns of ceramics obtained by pyrolysis of polyzirconosilazane and polytitanosilazane, respectively.

The novel polyborosilazane obtained by the present invention is a compound having a boron-containing, high-molecular weight borosilazane structure obtained by reacting polysilazane having a larger molecular weight with a boron compound. Namely, one characteristic feature of the polyborosilazane resides in the use of a polysilazane as a starting material for producing it.

The reaction between the polysilazane and the boron compound and the structure of the polymer compound obtained by the reaction vary with the kind of the boron compound.

In the case of using, for example, a boron alkoxide as the boron compound, the polyborosilazane obtained has a structure wherein side chains, cyclization and/or crosslinkages are formed by the reaction between hydrogen atom bound to at least part of the silicon atom and/or nitrogen atom of the polysilazane main skeleton and the boron alkoxide for condensation between the silicon atom and and/or nitrogen atom and the boron alkoxide.

In the reaction between a Si—H bond of a polysilazane and a boron alkoxide [B(OR$^5$)$_3$], the organic group (R$^5$) of the boron alkoxide pulls the hydrogen atom of the Si—H bond to form R$^5$H and a Si—O—B bond as follows.

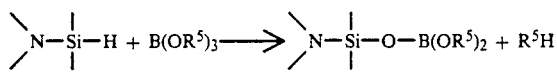

In the reaction between a N—H bond of a polysilazane and a boron alkoxide, the boron alkoxide pulls the hydrogen atom of the N—H bond to thereby form N—O—B bond or N—B bond (hereinafter these are represented as "N—Y—B" bond) as follows.

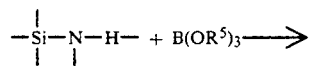

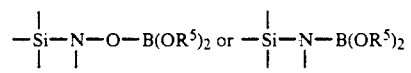

Since the boron alkoxide can be trifunctional at the most, the resulting polyborosilazane can be a mono-, di or trifunctional polymer with respect to boron depending upon the kind of the starting boron alkoxide or upon the reaction conditions employed. The "monofunctional" polymer has the following structure wherein pendant groups are bound to Si and/or N of the main chain of the polysilazane.

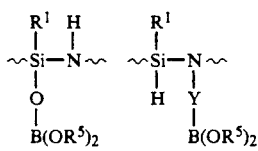
(VI)

In the "bifunctional" or "trifunctional" polymer, a cyclic and/or crosslinked structure is formed in or between the polysilazane skeletons through B atom as shown below. The cyclic structure includes a structure wherein two functional groups within one molecule of the boron alkoxide are condensed with a silicon atom and a nitrogen atom located adjacent to each other of the polysilazane. The crosslinked structure is formed when two or more functional groups of the boron alkoxide are condensed with two or more molecules of the polysilazane.

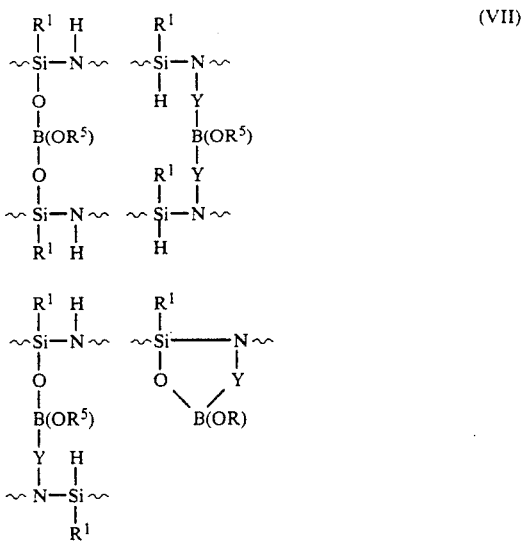
(VII)

The trifunctional polymers may possess both of the cyclic structure and the crosslinked structure described above at the same time. The reaction between the polysilazane and the boron alkoxide usually yields a polymer represented by (VI) or (VII).

Thus, the structural change of the polysilazane to the polyborosilazane includes the formation of pendant groups, cyclic structures and/or crosslinked structure on the polysilazane fundamental skeletons.

In the reaction between a Si—H bond of a polysilazane and a halogen-containing compound of the boron compounds B(R$^4$)$_3$, a halogen atom of the boron compound BX$_m$(R$^4$)$_{3-m}$ (wherein X represents a halogen atom, and m=1, 2 or 3) pulls the hydrogen atom of Si—H bond to form HX and a Si—B bond as follows.

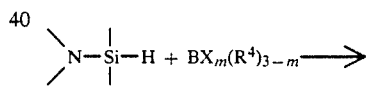

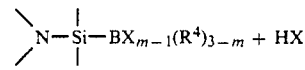

In the reaction between a N—H bond of a polysilazane and a halogen-containing compound of the boron compounds, a halogen atom of the boron compound pulls the hydrogen atom of N—H bond to form HX and a N—B bond as follows.

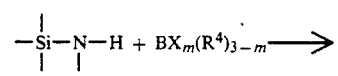

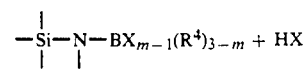

Since the boron compound BX$_m$(R$^4$)$_{3-m}$ can be trifunctional at the most depending upon the number of halogen atoms, the resulting polyborosilazane can be from mono- to trifunctional polymer with respect to boron. The "monofunctional" polymer has the following structure wherein pendant groups are bound to Si and/or Ni of the main chain of polysilazane.

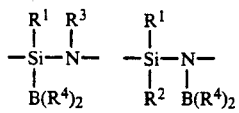

In the "bifunctional" or "trifunctional" polymer, a cyclic and/or crosslinked structure is formed in or between the polysilazane skeletons through B atom as shown below. The cyclic structure includes a structure wherein two functional groups within one molecule of the boron compound are condensed with a silicon atom and a nitrogen atom located adjacent to each other of the polysilazane. The crosslinked structure is formed when two or more functional groups of the boron compound are condensed with two or more molecules of polysilazane.

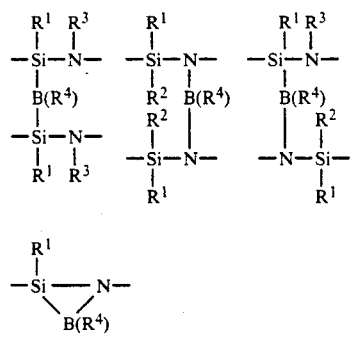

The trifunctional polymers may possess both of the cyclic structure and the crosslinked structure described above at the same time.

In the reaction between a Si—H bond of a polysilazane and a hydrogen-containing compound of the boron compounds $B(R^4)_3$, a hydrogen atom of the boron compound $BH_m(R'')_{3-m}$ pulls the hydrogen atom of the Si—H bond to form $H_2$ and Si—B bond as follows.

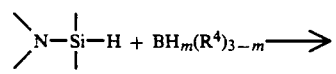

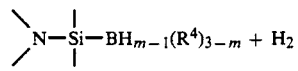

In the reaction between a N—H bond of a polysilazane and a hydrogen-containing compound of the boron compounds, a hydrogen atom of the boron compound pulls the hydrogen atom of N—H bond to form $H_2$ and a N—B bond as follows.

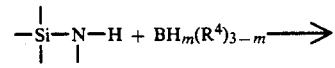

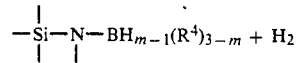

Since the boron compound $BH_m(R^4)_{3-m}$ can be trifunctional at the most depending upon the number of hydrogen atoms, the resulting polyborosilazane can be from mono- to trifunctional polymer with respect to boron. Hence, there can be obtained polysilazanes of the same structure as described with respect to the halogen-containing boron compound $BX_m(R_4)_{3-m}$.

In the reaction between a Si—H bond of a polysilazane and the boron compounds $B(R^4)_3$ having an alkyl group, an alkenyl group, a cycloalkyl group, an aryl group or an alkylamino group, an organic group of the boron compound $B(R^4)_3$ pulls the hydrogen atom of Si—H bond to form $R^4H$ and a Si—B bond as follows.

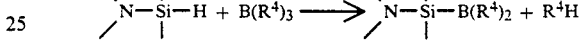

However, when one of the two moieties bound to the nitrogen atom of the alkylamino group is a hydrogen atom, a dehydrogenation reaction takes place to form Si—N—B bond according to the following reaction.

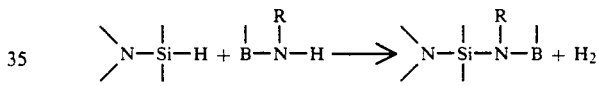

In the reaction between a N—H bond of a polysilazane and a boron compound having an alkyl group, an alkenyl group, a cycloalkyl group, an aryl group or an alkylamino group, an organic group of the boron compound pulls the hydrogen atom of the N—H bond to form $R^4H$ and an N—B bond as follows.

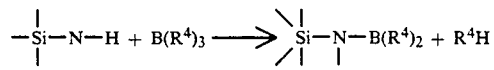

Since the boron compound $B(R^4)_3$ can be trifunctional at the most, the resulting polyborosilazane has the same structure as shown above with respect to the case of using the boron compound $Bx_m(R^4)_{3-m}$ or $BH_m(R^4)_{3-m}$.

In the reaction between a Si—H bond of a polysilazane and a boron compound $B(R^4)_3$ having an amino group or a hydroxyl group, a hydrogen atom in Z of the boron compound $BZ_m(R^4)_{3-m}$ (where Z is an amino group or a hydroxyl group) pulls the hydrogen atom of the Si—H bond to form $H_2$ and a Si—N—B bond or a Si—O—B bond as follows.

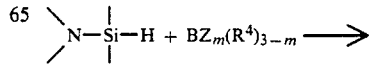

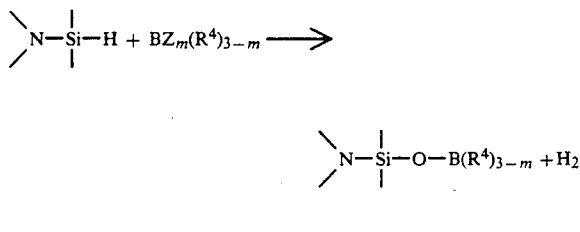

In the reaction between a N—H bond of a polysilazane and a boron compound having an amino group or hydroxyl group, a hydrogen atom of the N—H bond is pulled to form $H_2$ and a N—N—B bond or a N—O—B bond as follows.

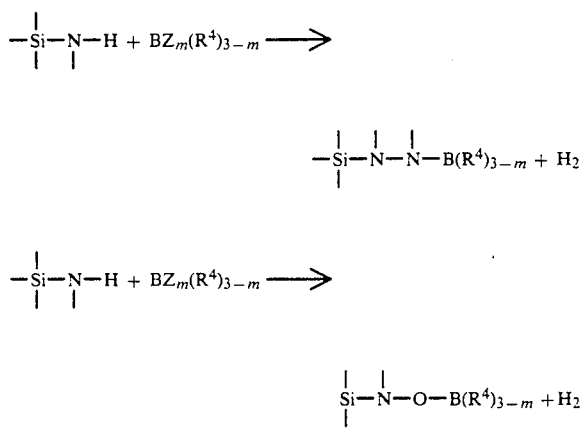

Since the boron compound $BZ_m(R^4)_{3-m}$ can be trifunctional at the most depending upon the number of amino group or hydroxyl group, the resulting polyborosilazane can be from monofunctional to trifunctional polymer with respect to boron. The monofunctional polymer has a structure wherein pendant groups are bound to Si and/or N of the main chain of polysilazane as shown below.

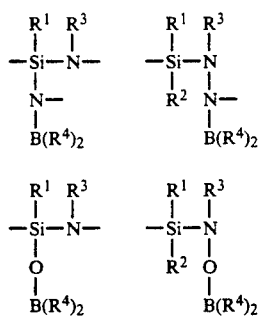

In the bifunctional or trifunctional polymer, a cyclic and/or crosslinked structure is formed in or between the polysilazane skeletons through B atom as shown below. The cyclic structure includes a structure wherein two functional groups within one molecule of the boron compound are condensed with a silicon atom and a nitrogen atom adjacent to each other of polysilazane. The crosslinked structure is formed when two or more functional groups of the boron compound are condensed with two or more molecules of the epolysilazane.

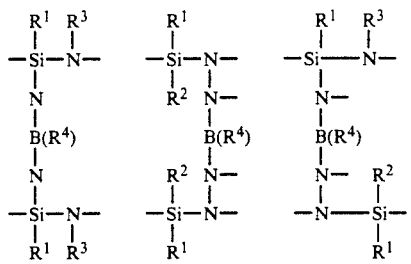

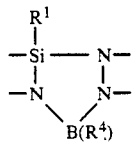

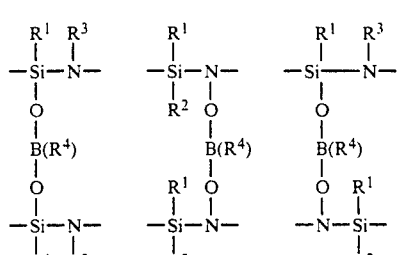

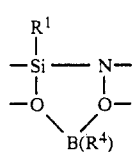

The trifunctional polymers may possess both of the cyclic structure and the crosslinked structure described above at the same time.

In the reaction between a Si—H bond of a polysilazane and a boron compound $(R^4OB)_3$, $R^4$ of the boron compound $(R^4OB)_3$ pulls the hydrogen atom of the Si—H bond to form $R^4H$ and a Si—B bond as follows.

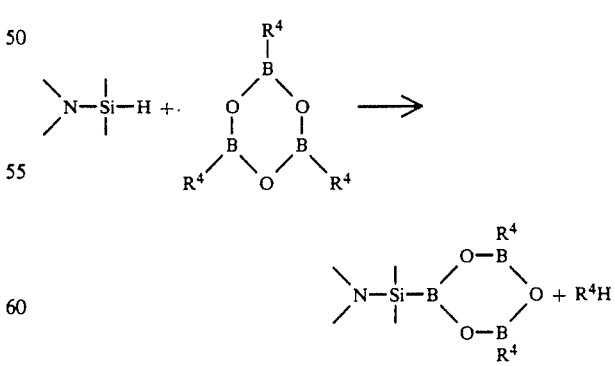

In the reaction between a N—H bond of a polysilazane and a boron compound $(R^4OB)_3$, $R^4$ of the boron compound $(R^4OB)_3$ pulls the hydrogen atom of the N—H bond to form $R^4H$ and a N—B bond as follows.

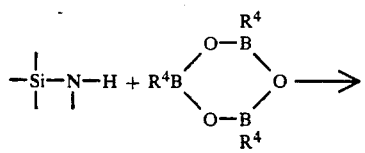

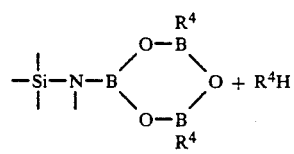 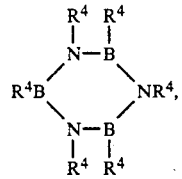

Since the boron compound (R⁴OB)₃ can be trifunctional at the most, the resulting polyborosilazane can be from monofunctional to trifunctional polymer with respect to the boron compound depending upon the kind of the starting boron compound or upon the reaction conditions employed. The monofunctional polymer has a structure wherein pendant groups are bound to Si and/or N of the main chain of polysilazane as shown below.

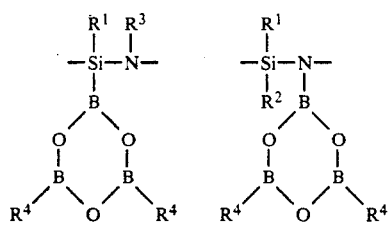

In the bifunctional or trifunctional polymer, a cyclic and/or crosslinked structure is formed in or between the polysilazane skeletons through B atom as shown below. The cyclic structure includes a structure wherein two functional groups within one molecule of the boron compound are condensed with a silicon atom and/or a nitrogen atom of a single molecule of the polysilazane. The crosslinked structure is formed when two or more functional groups of the boron compound are condensed with two or more molecules of polysilazane.

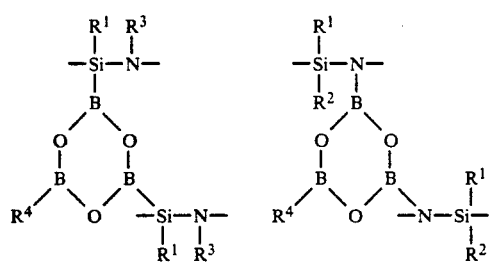

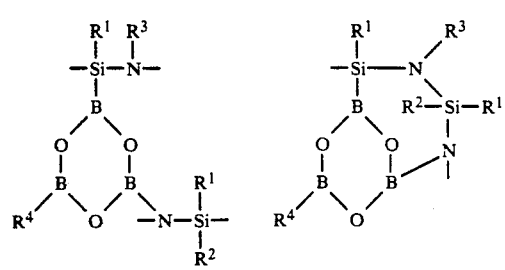

The trifunctional polymers may possess both of the cyclic structure and the crosslinked structure described above at the same time.

In the reaction between a Si—H bond of a polysilazane and a boron compound

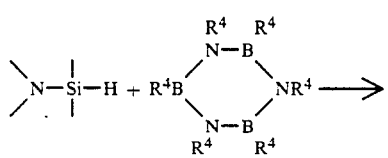

R⁴ of the boron compound pulls the hydrogen atom of the Si—H bond to form R⁴H and a Si—B bond or a SiN bond as follows.

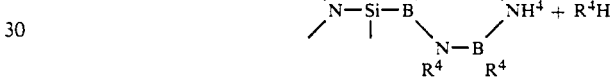

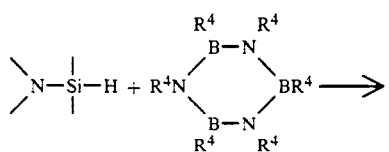

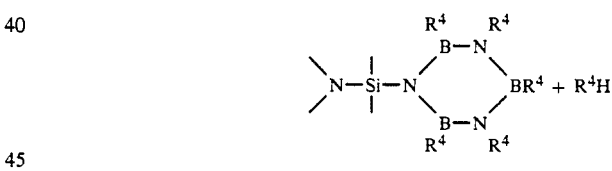

In the reaction between a N—H bond of a polysilazane and a boron compound

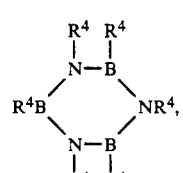

R⁴ of the boron compound pulls the hydrogen atom of the N—H bond to form R⁴ and a N—B bond or a N—N bond as follows.

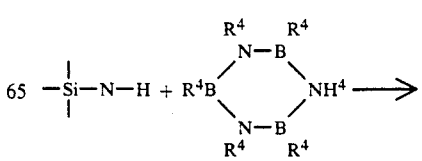

-continued

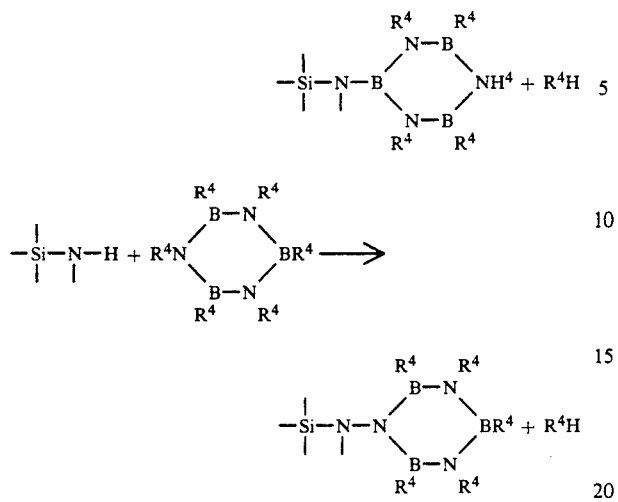

Since the boron compound

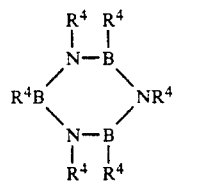

can be hexafunctional at the most, the resulting polyborosilazane can be from monofunctional polymer to a hexafunctional polymer with respect to the boron compound. The monofunctional polymer has a structure wherein pendant groups are bound to Si and/or N of the main chain of polysilazane as shown below.

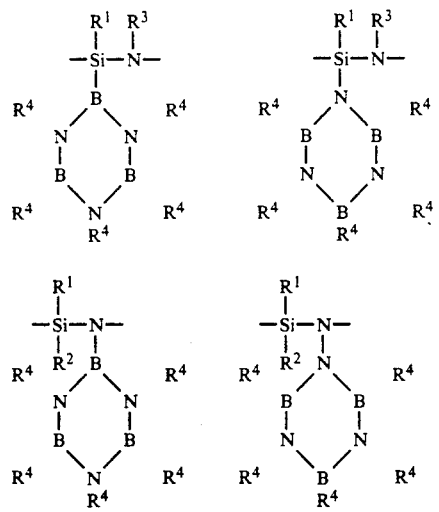

In the bifunctional to hexafunctional polymer, a cyclic and/or crosslinked structure is formed in or between the polysilazane skeletons through B atom as shown below. The cyclic structure includes a structure wherein two functional groups within one molecule of the boron compound are respectively condensed with a silicon atom and/or a nitrogen atom of a single molecule of the polysilazane. The crosslinked structure is formed when two or more functional groups of the boron compound are condensed with two or more molecules of the polysilazane.

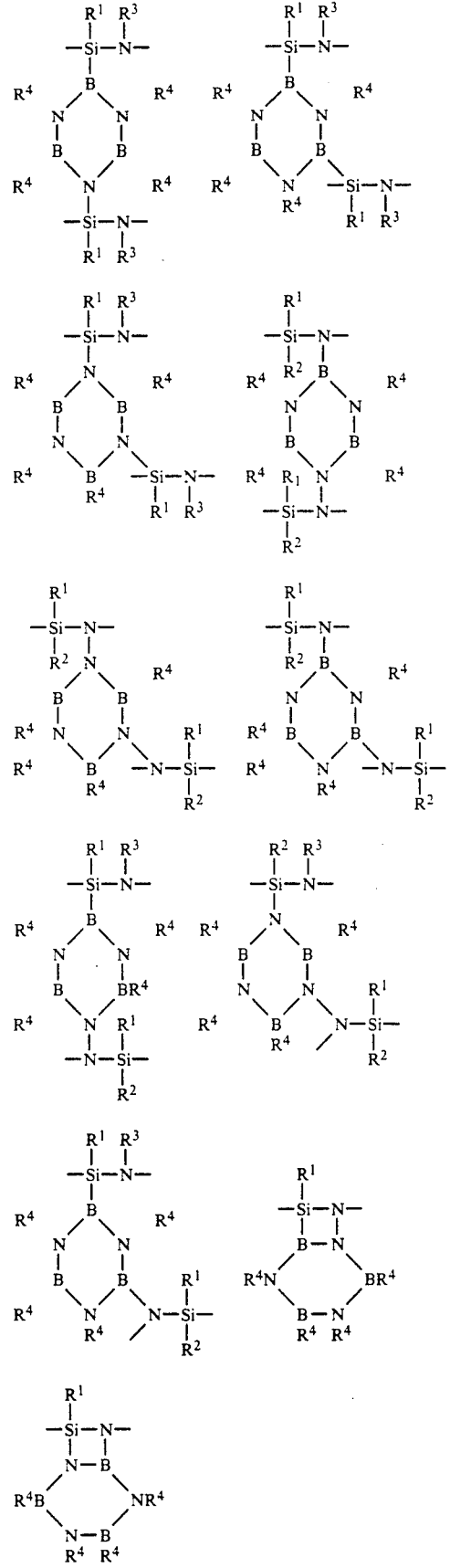

The trifunctional to hexafunctional polymers may possess both of the cyclic structure and the crosslinked structure described above at the same time.

The reaction between a polysilazane and a boron compound $B(R^4)_3:L$ is similar to that between a polysilazane and $B(R^4)_3$ with respect to the reaction mechanism and the structure of the product, since the complex-forming ligand L does not react with the polysilazane.

The polysilazane used in the present invention has Si—H bonds and N—H bonds within the molecule. Copolymers or mixtures of polysilazanes with other polymers or compounds may also be used for the purpose of the present invention.

The polysilazane to be used as a starting material in the present invention includes those which have a chain-like, cyclic and/or crosslinked structure within the molecule thereof. These may be used independently or as a mixture thereof.

Typical examples of the polysilazane expressed by the above general formula (I) include the following ones which, however, are not limitative at all.

In general, $R^1$, $R^2$ and $R^3$ of the general formula (I) may be hydrogen, a hydrocarbyl group, a group other than the hydrocarbyl group and containing a carbon atom bonded directly to the silicon atom of the general formula (I), an alkylsilyl group, an alkylamino group and an alkoxy group. It is preferred that $R^1$, $R^2$ and $R^3$ be selected from hydrogen, an alkyl group containing 1 to 5 carbon atoms, an alkenyl group containing 2 to 6 carbon atoms, a cycloalkyl group containing 5 to 7 carbon atoms, an aryl group, an aralkyl group an alkylsilyl group containing 1 to 4 carbon atoms, an alkylamino group containing 1 to 5 carbon atoms and an alkoxy group containing 1 to 5 carbon atoms, since these groups have a less steric hindrance. More preferable examples of $R^1$, $R^2$ and $R^3$ include hydrogen, a methyl group, an ethyl group, a vinyl group, an allyl group, a methylamino group, an ethylamino group, a methoxy group and an ethoxy group.

Those represented by the general formula (I) wherein $R^1$, $R^2$ and $R^3$ are all hydrogen atoms are perhydropolysilazanes. Process for their preparation are reported in, for example, Japanese Unexamined Patent Publication No. 60-145903 and D. Seyferth et al; "Communication of Am. Cer. Soc.", C-13, January 1983. These processes give a mixture of polymers having different structures which, however, fundamentally contain chain-like portions and cyclic portions and are represented by the following chemical formula:

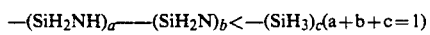

One example of the structure of perhydropolysilazane is shown below:

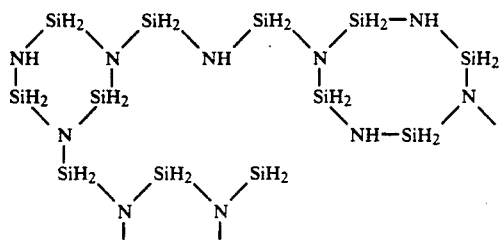

A process for preparing a polysilazane of the general formula (I) wherein $R^1$ and $R^2$ are hydrogen atoms and $R^3$ is a methyl group is reported by D. Seyferth et al in "Polym. Prepr." Am. Chem. Soc., Div. Polym. Chem., 25. 10 (1984). The polysilazane obtained by this process is a chain polymer and a cyclic polymer having recurring units of —(SiH$_2$NCH$_3$)— and is free of crosslinkage structure.

Processes for preparing a polysilazane of the general formula (I) wherein $R^1$ and $R^3$ are hydrogen atoms and $R^2$ is an organic group are reported by D. Seyferth et al in "Polym. Prepr." Am. Chem. Soc., Div. Polym. Chem., 25, 10 (1984) and Japanese Unexamined Patent Publication 61-89230. The polysilazanes obtained by these processes are those which have a cyclic structure having recurring units of —(R$^2$SiHNH)— with a polymerization degree of mainly 3 to 5 and those which have both a chain structure and a cyclic structure at the same time and which are represented by the chemical formula of

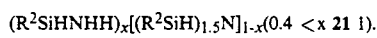

Polysilazanes of the formula (I) wherein $R^1$ is a hydrogen atom and $R^2$ and $R^3$ are organic groups and polysilazanes of (I) wherein $R^1$ and $R^2$ are organic groups and $R^3$ is a hydrogen atom have a cyclic structure having recurring units of —(R$^1$R$^2$SiNR$^3$)— with a polymerization degree of mainly 3 to 5.

The polysilazane of the formula (I) further includes polyorgano(hydro)silazanes which have a crosslinked structure within molecule as are reported by D. Seyferth et al; "Communication of Am. Cer. Soc.", C-132, July 1984. One example is shown below.

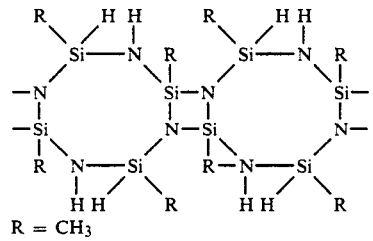

R = CH$_3$

In addition, polysilazanes (R$^1$Si(NH)$_x$) obtained by ammonolysis of R$^1$SiX$_3$ (where X is halogen) and having a crosslinked structure as reported by Japanese Unexamined Patent Publication No. 49-69717 or polysilazanes of the following structure:

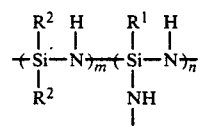

obtained by coammonolysis of R$^1$SiX$_3$ and R$_2^2$SiX$_2$ may also be used as the starting materials.

As described above, polysilazanes used in the present invention have main skeletons comprising the recurring units represented by the general formula (I). The units of (I) in some cases are cyclized as is apparent from the above descriptions and, in such cases, the cyclized portion forms a terminal group. In other cases where such cyclized portions are not formed, the main skeletons can be terminated by the same group as $R^1$, $R^2$ or $R^3$ or by hydrogen. As the starting polysilazanes, organic solvent-insoluble ones as shown below may be used as well as organic solvent-soluble ones as described above. However, since these organic solvent-insoluble polysilazanes provide organic solent-insoluble reaction products, they are limited as to application of the product.

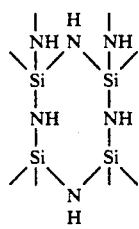

[Si(NH$_2$)]$_n$ M. Billy, Bull. Soc. Chim. Fr., 183(1962)

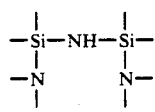

[Si$_2$N$_3$H]$_n$ M. Billy, Bull. Soc. Chim. Fr., 1550(1961)

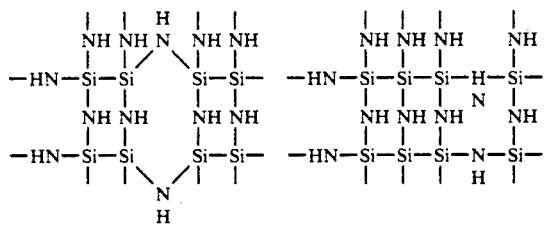

[Si$_2$(NH)$_3$]$_n$     [Si$_3$(NH)$_4$]$_n$

M. Billy, Compt. Rend., 250, 4163(1960); 251, 1639(1960)

The polysilazanes used in the present invention have a number average molecular weight of about 100 to about 50,000 and include cyclic polysilazane, chain polysilazane or a mixture thereof. Preferred polysilazanes have a number-average molecular weight of about 250 to about 20,000, more preferably about 500 to about 10,000. If the molecular weight is less than 100, there results a low-molecular weight reaction product with a boron compound. Such a product is a viscous liquid and is, therefore, limited as to its application. In addition, it scatters in a large quantity during a pyrolysis step and gives a ceramic in only a low yield, thus not being preferable. If the molecular weight exceeds 50,000, the resulting reaction product with a boron compound becomes solvent-insoluble or liable to form a gel.

The boron compound to be used in the present invention may be a compound represented by one of the following general formulae:

B(R$^4$)$_3$                                                (II)

(R$^4$BO)$_3$                                              (III)

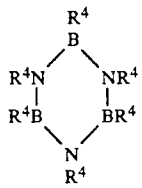

B(R$^4$)$_3$:L                                            (V)

wherein R$^4$ and L are the same as defined hereinbefore.

The group R$^4$ is preferably hydrogen, halogen, an alkyl group having 1-20, more preferably 1-10, most preferably 1-4 carbon atoms, an alkoxy group having 1-20, more preferably 1-10, most preferably 1-4 carbon atoms, an aryl group having 1-10 carbon atoms or an aralkyl group having 1-10 carbon atoms. Illustrative of suitable groups R$^4$ are methyl, ethyl, n-propyl, i-propyl, n-butyl, i-butyl, t-butyl, phenyl, benzyl, tolyl, methoxy, ethoxy, n-propoxy, i-propoxy, n-butoxy, i-butoxy, t-butoxy and phenoxy.

Of B(R$^4$)$_3$, examples of those which have a halogen atom or atoms as R$^4$ include fluoroborane, tribromoborane, trifluoroborane, trichloroborane, difluoroborane, diiodoborane, iodoborane, dibromomethylborane, dichloromethylborane, difluoromethylborane, difluoromethoxyborane, diiodomethylborane, ethynyldifluoroborane, difluorovinylborane, dibromoethylborane, dichloroethylborane, dichloroethoxyborane, ethyldifluoroborane, ethyldiiodoborane, bromodimethylborane, dibromo(dimethylamino)borane, chlorodimethylborane, chlorodimethoxyborane, fluorodimethylborane, fluorodimethoxyborane, dichloroisopropylborane, dichloropropylborane, difluoropropoxyborane, bromo(dimethylamino)methylborane, chlorodivinylborane, dibromobutylborane, butyldichloroborane, butyldifluoroborne, butoxydifluoroborane, bromodiethylborane, dibromo(diethylamino)borane, chlorodiethylborane, chlorodiethoxyborane, dichloro(pentafluorophenyl)borane, dichloro(diethylamino)borane, (diethylamino)difluoroborane, bromobis(dimethylamino)borane, chlorobis(dimethylamino)borane, bis(dimethylamino)fluoroborane, dibromophenylborane, dichlorophenylborane, difluorophenylborane, difluorophenoxyborane, diiodophenylborane, dibromo(1,3-dimethyl-1-butenyl)borane, dibromo(3,3-dimethyl-1-butenyl)borane, dibromo(1-ethyl-1-butenyl)borane, dibromo-1-hexenylborane, dibromo(2-methyl-cyclopentyl)borane, 2-methylcyclopentyl-dichloroborane, dibromohexylborane, dibromo(2-methylpentyl)borane, difluoroborane, dibromo(dipropylamino)borane, chlorodipropylborane, chloro(1,1,2-trimethylpropyl)borane, dichloro(diisopropylamino)borane, butyl(dimethylamino)fluoroborane, dichloro(4-methylphenyl)borane, dichloro(methylphenylamino)borane, bromo(dimethylamino)phenylborane, chloro(dimethylamino)phenylborane, 9-bromo-9borabicyclo[3,3,1]nonane, 9-chloro-9-borabicyclo[3,3,1]nonane, diethylaminochloro-(1-butenyloxy)borane, dichlorooctylborane, bromobis(1-methylpropyl)borane, bromodibutylborane, dibromo(dibutylamino)borane, chlorobis(2-methylpropyl)borane, dibutylchloroborane, dichloro(dibutylamino)borane, dibutylfluoroborane, bromobis(biethylamino)borane, chlorobis(diethylamino)borane, dichloro(2,4,6-trimethylphenyl) borane, 3-bromo-7-methyl3-borabicyclo[3,3,1]nonane, (diethylamino)chloro(cyclopentenyloxy)borane, dichloro(1,2,3,4,5-pentamethyl-2,4-cyclopentadien-1-yl)borane, dibromo(1,2,3,4,5-pentamethyl-2,4-cyclopentadien-1-yl)borane, diiodo(1,2,3,4,5-pentamethyl-2,4-cyclopentadien-1-yl)borane, chlorodicyclopentylborane, chloro(diethylamino)phenylborane, bromodicyclopentylborane, (1-butyl-1-hexenyl)dichloroborane, bromodipentylborane, chlorodiphenylborane, bromodiphenylborane, dichloro(diphenylamine)borane, chloro(diisopropylamino)phenylborane, chloro(dipropylamino)phenylborane, bromobis(2-bromo1-hexenyl)borane, chlorobis(2-chloro-1-hexenyl)borane, chlorobis(2-chloro-1-hexenyl)borane, chlorodicyclohexylborane, chlorodi-1-hexenylborane, chloro(1-ethyl-1-butenyl)(1,1,2trimethylpropyl)borane, chloro-1-hexenyl(1,1,2-trimethylpropyl)borane, [methyl(4-bromophenyl)amino]chloro(phenyl)borane, chloro-(2-phenylethynyl)(1,1,2-trimethylpropyl)borane, chloro(dibutylamino)phenylborane, chlorooctyl(1,1,2trimethylpropyl)borane, chlorobis(dibutylamino)borane, fluorobis(2,4,6-trimethylphenyl)borane, (1-bromo-1-hexenyl)-bis(2-methylpentyl)borane, (1-bromo-1-hexenyl)dihexylborane, bis(1-butyl-1-hexenyl)chloroborane, and 5-chloro-1-pentenyl)bis(1,2-dimethylpropyl)borane.

Examples of the boron compounds wherein $R^4$ is an alkoxy group include dihydroxymethoxyborane, dimethoxyborane, methoxydimethylborane, methyldimethoxyborane, trimethoxyborane, ethyldimethoxyborane, dimethylaminomethoxymethylborane, (dimethylamino)dimethoxyborane, diethylmethoxyborane, dimethoxypropylborane, bis(dimethylamino)methoxyborane, ethoxydiethylborane, butyldimethoxyborane, diethoxyethylborane, triethoxyborane, cyclopentyldimethoxyborane, methoxydipropylborane, dimethoxyphenylborane, (2-methylcyclopentyl)dimethoxyborane, butoxydiethylborane, ethoxydipropylborane, hexyldimethoxyborane, 3-methoxy-3-borabicyclo[3,3,1]nonane, 9-methoxy-9-borabicyclo[3,3,1]nonane, di-butylmethoxyborane, methoxybis(1-methylpropyl)borane, methoxybis(2methylpropyl)borane, propoxydipropylborane, triisopropoxyborane, tripropoxyborane, butoxydipropylborane, dibutylethoxyborane, diethyl(hexyloxy)borane, dibutoxyethylborane, di-tert-butoxyethylborane, dicyclopentylmethoxyborane, dibutylpropoxyborane, ethoxydipentylborane, (hexyloxy)dipropylborane, tributoxyborane, tri-tert-butoxyborane, tris(2-butoxy)borane, tris(2-methylpropoxy)borane, methoxydiphenylborane, dicyclohexyl(methoxy)boran, dibutyl(2-penten-3-yloxy)borane, dibutoxypentylborane, ethoxydiphenylborane, (2-aminoethoxy)diphenoxyborane, dibutyl(1-cyclo-hexenyloxy)-borane, butoxydipentylborane, dibutyl(hexyloxy)borane, dibutoxyhexylborane, dihexyloxypropylborane, tripentyloxyborane, butoxydiphenylborane, (2-methylpropoxy)diphenylborane, diphenoxyphenylborane, triphenoxyborane, tricyclohexyloxyborane, methoxybis(2,4,6-trimethylphenyl)borane, tribenzyloxyborane, tris(3methylphenoxy)borane, trioctyloxyoxyborane, trinonyloxyborane and trioctadecyloxyborane.

Examples of the boron compounds wherein $R^4$ is an alkenyl group include ethynylborane, vinylborane, dihydroxyvinylborane, 2-propenylborane, ethynyldimethoxyborane, methyldivinylborane, trivinylborane, 1-hexenyldihydroxyborane, dimethoxy(3-methyl1,2-butadienyl)borane, diethyl-2-propenylborane, dihydroxy(2-phenylethenyl)borane, (diethylamino)diethynylborane, diethylaminodi-1-propynylborane, 2-butenyldiethylborane, diethyl(2-methyl-2-propenyl)borane, bis(dimethylamino)(1-methyl-2-propenyl)borane, 2-butenyl bis(dimethylamino)borane, tri-2-propenylborane, tri(2propenyloxy)borane, diethyl(3-methyl-2-butenyl)borane, 2-propenyldipropylborane, (diethylamino)di-1-propynylborane, butyldi-2-propenylborane, 2-butenyldipropylborane, diethyl(1-ethyl-2-butenyl)borane, (2-methyl-2propenyl)dipropylborane, diethyl(1,1-dimethyl-3-buten-1-yloxy)borane, diethyl(1-hexen-4-yloxy)borane, 9-(2-propenyl)-9-borabicyclo[3,3,1]nonane, dibutyl-2-propenylboran, (3-methyl-2-butenyl)dipropylborane, 9-(2-buteny)-9-borabicyclo[3,3,1]nonane, tri-2-butenylborane, tris(2-methyl-2propenyl)borane, hexyldi-2-propenylborane, 2-butenyldibutylborane, bis(1,2-dimethylpropyl)(2phenylethenyl)borane, and bis(1,2-dimethylpropyl)1-octenylborane.

Examples of the boron compounds wherein $R^4$ represents an alkylamino group or an amino group include aminoborane, diaminoborane, aminodimethylborane, (dimethylamino)borane, dimethyl(methylamino)borane, methylbis(methylamino)borane, tris(methylamino)borane, (dimethylamino)dimethylborane, bis(dimethylamino)borane, bis(dimethylamino)methylborane, aminodipropylboran, (diethylamino)dimethylborane, (dimethylamino)diethylborane, tris(dimethylamino)borane, isopropylbis(dimethylamino)borane, dimethyl(phenylamino)borane, bis(methylamino)phenylborane, bis(dimethylamino)-1pyrrolylborane, aminodibutylborane, diethylaminodiethylborane, dimethylaminodipropylborane, bis(dimethylamino)phenylborane, dibutyl(diethylamino)borane, di-tert-butyl(dimethylamino)-borane, dibutyl(diethylamine)borane, tris(diethylamino)borane, tris(ethylamino)borane, dimethylaminodiphenylborane and aminobis(2,4,6-trimethylphenyl)borane.

Examples of the boron compounds wherein $R^4$ represents a hydroxy group include boric acid, hydroxyborane, dihydroxy(methyl)borane, hydroxydimethylborane, ethyldidroxyborane, dihydroxypropylborane, 2-furanyldihydroxyborane, diethylhydroxyborane, butyldihydroxyborane, cyclopentyldihydroxyborane, pentyldihydroxyborane, (3-aminophenyl)dihydroxyborane, phenyldihydroxyborane, heptyldihydroxyborane, dihydroxy(2-phenylethyl)borane, dihydroxy(1naphthalenyl)borane, hydroxybis(2,4,6-trimethylphenyl)borane and hydroxydiphenylborane.

Examples of the boron compounds wherein $R^4$ represents an alkyl group include methylborane, dimethylborane, ethylborane, trimethylborane, diethylborane, ethyldimethylborane, diethylmethylborane, 3-methyl-2-butylborane, triethylborane, (1,1,2-trimethylpropyl)borane, dibutylborane, triisopropylborane, tripropylborane, bis(3-methyl-2butyl)borane, bis(1,1,2-tri-methylpropyl)borane, tri-tert-butylborane, tributylborane, tris(1-methylpropyl)borane, tris(2-methylpropyl)borane, tripentylborane, tris(1,2-dimethylpropyl)borane, trihexylborane and trioctylborane.

Examples of the boron compounds wherein $R^4$ represents a cycloalkyl group include cyclopentylborane, cyclohexylborane, dicyclohexylborane, cyclohexyl(1,1,2-trimethylpropyl)borane, tricyclopentylborane, and tricyclohexylborane.

Examples of the boron compounds wherein $R^4$ represents an aryl group include tri-1-naphthylborane, tris(2,4,6-trimethylphenyl)borane, tribenzylborane, tris(4-methylphenyl)borane, triphenylborane, phenylborane and ethyldiphenylborane.

An example of the boron compound wherein R⁴ represents a hydrogen atom is borane.

Examples of (R⁴BO)₃ include boroxine, trifluoroboroxine, trimethylforoxine, trimethoxyboroxine, triethylboroxine, triethoxyboroxine, triphenylboroxine, triphenoxyboroxine, tris(4-ethenylphenyl)boroxine, tris(dimethylamino)boroxine, tributylboroxine, tributoxyboroxine, and tricyclohexylboroxine.

Examples of

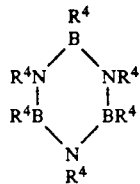

include 2,4,6-trichloroborazine, 2,4,6-tribromoborazine, 2,4,6trifluoroborazine, borazine, 1-methlborazine, 2,4,6-trichloro1,3,5-trimethylborazine, 2,4,6-trifluoro-1,3,5-trimethylborazin, 1,3,5-trimethylborazine, 2,4,6-trimethylborazine, 2,4,6-trimethoxyborazine, 2,4-dichloro-1,3,5,6-tetramethylborazine, 2-chloro-1,3,4,5,6-pentamethylborazine, 2,4,6-trichloro1,3,5-triethylborazine, hexamethylborazine, 1,3,5-triethylborazine, 4,6-triethylborazine, 1,3,5-tripropylborazine, 2,4,6-triethyl-1,3,5-trimethylborazine, 1,3,5-tributyl-2,4,6-trichloroborazine, hexaethylborazine, 2,4,6-trichloro-1,3,5-triphenylborazine, 2,4,6-triphenylborazine, 2,4,6-tri(diethylamino)borazine, 2,4,6-tri(bis(trimethylsilyl)amino)borazine, 2,4,6-tris(dimethylamino)-1,3,5-trimethylborazine, and 1,3,5-trimethyl-2,4,6-triphenylborazine.

Examples of B(R⁴)₃:L include borane-phosphine, boranehydrazine, trifluoroborane-methanol, cyanoborane-ammonia, di-fluoroborane-methylamine, borane-methylamine, tribromoboranedimethylsulfide, trichloroborane-dimethylsulfide, trifluoro-borane-dimethyl ether, trifluoroborane-ethanol, borane-isocyanomethane, dibromoborane-dimethylsulfide, dichloroborane-dimethylsulfide, trichloroborane-dimethylamine, trifluoroborane-ethylamine, cyanoborane-methylamine, bromoborane-dimethylsulfide, chloroborane-dimethylsulfide, difluoroborane-dimethylamine, iodoborane-dimethylsulfide, chloroborane-dimethylamine, boranedimethylamine, borane-dimethylphosphine, tribromoborane-trimethylphosphine, tribromoborane-trimethylamine, trichloroboranetrimethylamine, trichloroborane-trimethylphosphine, trifluoro-borane-trimethylamine, trifluoroborane-trimethylphosphine, tri-iodoborane-trimethylphosphine, cyanoborane-dimethylamine, di-fluoroborane-trimethylamine, bromoborane-trimethylphosphine, chloroborane-trimethylphosphine, fluoroborane-trimethylamine, iodoborane-trimethylamine, iodoborane-trimethylphosphine, borane-trimethylamine, trimethylborane-ammonia, trimethoxyborane-ammonia, borane-trimethylphosphite, boranetrimethylphosphine, trifluoroborane-2-methylimidazole, trifluoroborane-tetrahydrofuran, chloroborane-tetrahydrofuran, trichloroborane-diethyl ether, trifluoroborane-diethyl ether, dibromoborane-diethyl ether, dichloroborane-diethyl ether, cyanoborane-trimethylamine, bromoborane-diethyl ether, dibromoborane-trimethylamine, dibromomethylboranetrimethylphosphine, chloroborane-diethyl ether, borane-tertbutylamine, borane-diethylamine, tribromoborane-pyridine, tri-chloroborane-pyridine, trifluoroborane-pyridine, boranepyridine, borane-4-aminopyridine, bromodimethylboranetrimethylphosphine, dichlorocyanoborane-pyridine, trifluoroborane-phenol, cyanoborane-pyridine, dibromomethylborane-pyridine, borane-4-methylpyridine, trifluoroborane-1-hexanol, tribromoborane-triethylamine, trichloroborane-triethylamine, chloroborane-triethylamine, borane-triethylamine, trimethylborane-trimethylamine, borane-tris(dimethylamino)phosphine, trifluoroboranemethoxybenzene, trifluoroborane-4-methylaniline, borane-2,6-dimethylpyridine, trifluoroborane-dibutyl ether, phenyldichloroborane-triethylamine, tribromoboranetriphenylphosphine, trichloroborane-triphenylphosphine, trifluoroborane-triphenylphosphine, borane-triphenylamine, borane-triphenylphosphine, trimethylborane-triphenylamine, triphenylborane-trimethylamine, triphenylborane-pyridine, and triphenylborane-triethylamine. In addition to the above-described compounds, tetraborane (10), pentaborane (9), pentaborane (11), hexaborane (10), hexaborane (12), octaborane (12), octaborane (18), isononaborane (15), nonaborane (15), decaborane (14), 1,1'-bipentaborane (9), 1,2'-bipentaborane (9), 2,2'-bipentaborane (9), 1-carbahexaborane (7), 2-carbahexaborane (9), 1,2-dicarbahexaborane (6), 1,2dicarbapentaborane (7), 2,4-dicarbaheptaborane (7), 2,3-dicarbahexaborane (8), 1,7-dicarbaoctaborane (8), 1,2-dicarbadodecaborane (12), 1,7-dicarbadodecaborane (12) and 1,12-dicarbadodecaborane (12) can offer good results.

Most of these boron compounds are commercially available, and those which are not commercially available can be prepared in the same manner as with the conventionally available ones.

A method of preparing the polyborosilazane will now be described in detail below.

The polysilazane and the boron compound are used in such a amounts that the mixing ratio of the polysilazane to the boron compound becomes 0.001 to 60, preferably 0.01 to 5, more preferably 0.05 to 2.5, in terms of B/Si atomic ratio. An amount of the boron compound in excess of the above range does not give any advantage since the excess boron compound is merely recovered as an unreacted reactant without enhancing reactivity of polysilazane. If, on the other hand, the boron compound is used in an amount below the above-specified range, high molecular weight product cannot be obtained.

The reaction may be conducted in the absence of a solvent. However, in comparison with the case of conducting the reaction in the presence of an organic solvent, reaction control is difficult and, in some cases, a gel product is formed. Hence, the use of an organic solvent is generally preferable. As the solvent, there may be used hydrocarbyl solvents such as aromatic hydrocarbons, aliphatic hydrocarbons or alicyclic hydrocarbons; halogenated hydrocarbons; aliphatic ethers and alicyclic ethers. Preferred solvents include halogenated hydrocarbons such as methylene chloride, chloroform, carbon tetrachloride, bromoform, ethylene chloride, ethylidene chloride, trichloroethane and tetrachloroethane, ethers such as ethyl ether, isopropyl ether, ethyl butyl ether, butyl ether, 1,2-dihydroxyethane, dioxane, dimethyldioxane, tetrahydrofuran and tetrahydropyrane, and hydrocarbons such as pentane, hexane, isohexane, methylpentane, heptane, isoheptane, octane, isooctane, cyclopentane, methylcyclopentane, cyclohexane, methylcyclohexane, benzene, toluene, xylene and ethylbenzene.

For the purpose of obtaining high molecular weight polyborosilazanes, it is advisable to perform the reaction of the polysilazane with the boron compound under a basic condition. By the term "basic condition" is meant a condition in the presence of a basic compound such as a tertiary amine, a secondary amine having a group with a steric hindrance or a phosphine. Such a basic condition can be established by adding the basic compound to the reaction mixture or by using, as a reaction solvent, a basic solvent or a mixture of a basic solvent and a non-basic solvent mentioned above. Such a basic compound is used in an amount of at least 5 parts by weight, preferably at lest 20 parts by weight, per 100 parts by weight of the reaction solvent. If the amount of the basic compound is less 5 parts by weight, a markedly high molecular weight product can not be obtained.

Any basic solvent may be employed as long as it does not decompose the polysilazane and boron compound. Examples of the basic solvent include trialkylamines such as trimethylamine, dimethylethylamine, diethylmethylamine and triethylamine, tertiary amines such as pyridine, picoline, dimethylaniline, pyrazine, pyrimidine, pyridazine and derivatives thereof, pyrrole, 3-pyrroline, pyrazole, 2-pyrazolyl, and a mixture thereof.

The reaction temperature is selected so as to maintain the reaction system in a liquid state. The reaction is generally conducted at a temperature higher than the boiling point of a solvent used so as to increase the molecular weight of the resulting polyborosilazane. In particular the reaction is conducted at 400° C. or lower, preferably −78° C. to 300° C for the purpose of preventing gelation due to thermal decomposition of the polyborosilazane.

As to reaction pressure, an ambient pressure is favored. Application of a pressure to the reaction system is not forbidden, but a reduced pressure is not favorable since low-boiling components are distilled off to decrease the yield of the intended product. The reaction time is generally 30 minutes to about one day but, in order to enhance polymerization degree of polyborosilazane, a prolonged reaction time is preferred.

The reaction atmosphere is preferably a dry inert atmosphere such as dry nitrogen or dry argon for the purpose of preventing oxidation or hydrolysis of the starting material and the reaction product.

The process according to the present invention is advantageous because expensive, noble metal catalysts need not be used.

The product polyborosilazane is separated from the reaction mixture by distilling off the unreacted boron compound under reduced pressure or by gel permeation chromatography or high-speed liquid chromatography.

The thus obtained polyborosilazane has an increased number of cross-linkages and a larger number average molecular weight (200–500,000, preferably 800–200,000) than the starting polysilazane. Hence, it has improved solidifying properties and permits rapid shaping at an ambient temperature. The increased high molecular weight of the polyborosilazane serves to minimize evaporation loss upon pyrolysis at elevated temperatures, thus yield of ceramics therefrom being improved. For example, the polyborosilazane of the present invention gives ceramics in a yield of 70 % or more, particularly 80 % or more. Notwithstanding its high molecular weight, the polyborosilazane is soluble in organic solvents such as o-xylene because of the formation of a number of pendant groups and side chains and, therefore, can be used as precursors for ceramic fibers, as binders for the preparation of composite materials, etc.

The polyborosilazane of the present invention can be easily converted to ceramics by pyrolysis under an atmospheric gas or in vacuo. As the atmospheric gas, nitrogen is advantageous, but argon or ammonia may be used as well. A mixed gas of, for example, nitrogen, ammonia, argon and hydrogen may also be utilized.

The pyrolysis temperature is generally in the range of from 700° to 1900° C. If the pyrolysis temperature is too low, the pyrolysis requires a prolonged period of time, whereas a too high temperature is disadvantageous in view of energy cost.

The heating rate is generally in the range of from 0.1° C./min to 300° C./min. If the heating rate is too slow, the pyrolysis requires a prolonged period of time, whereas too fast a rate causes rapid pyrolysis and shrinkage which can cause cracks in the resulting ceramics. Favorable results can be obtained by controlling the heating rate to 0.5° C./min to 50° C./min in the temperature range of up to 600° C. wherein pyrolysis of the polyborosilazane mainly takes place.

Polymetallosilazanes previously proposed by the inventors provide amorphous ceramics having an excellent high-temperature strength and modulus. For example, the ceramics retain the amorphous structure even when kept at 1200° to 1300° C. for about one hour. However, ceramics obtained by pyrolysis of the polyborosilazane according to the present invention have a better heat resistance. That is, they retain the amouphous structure at 1500° C. or above, some of them at 1700° C. or above. In general, polycrystalline substances have a poorer mechanical strength than amorphous substances since grain boundary acts as fracture origin. Ceramics obtained by pyrolysis of the polyborosilazane obtained by the present invention retain the amorphous structure thereof even at a temperature as high as 1700° C. and, therefore, exhibit an excellent high-temperature mechanical strength. The amorphous structure at 1700° C. is theoretically considered almost maximum with Si—N series ceramics. In consideration that 1700° C. is near the upper limit of heat resistance with respect to crystalline Si—N series ceramics, the heat resistance of the ceramics obtained by pyrolysis of the polyborosilazane is understood to be extremely excellent.

The polyborosilazanes of the present invention provide the following advantages.

(1) Ceramics obtained from metallosilazanes containing Al, Ti or Zr are known to have a better heat resistance than ceramics obtained from a starting polysilazane. Ceramics obtained from the polyborosilazane have a still better heat resistance than the above-described ceramics obtained from metallosilazanes, thus improvement in high-temperature mechanical strength being attained.

(2) Since the polyborosilazanes are soluble in organic solvents and can be converted to Si—N—B ceramics by calcination, they can be used for the production of composite ceramic moldings with high performance.

(3) Presence of boron in the ceramic obtained by pyrolysis of the polyborosilazane serves to improve hardness of the ceramic.

(4) Since formulation of the ceramic can be controlled, electric conductivity thereof can be selected from a wide range.

The following examples will further illustrate the present invention.

REFERENCE EXAMPLE 1

To a four-necked 1 liter flask equipped with a gas feed conduit, a mechanical stirrer and a Dewar condenser, an oxygen-free, dry nitrogen gas was fed to replace the air within the flask therewith. After charging 490 ml of deaerated, dry pyridine, the flask was cooled in an ice bath. Then, 51.6 g of dichlorosilane was added into the flask to form a white, solid precipitate of an adduct ($SiH_2Cl_2 2C_5H_5N$). Subsequently, with stirring and cooling the reaction mixture in the ice bath, 51.0 g of ammonia which had been passed successively through a sodium hydroxide-containing tube and an active carbon-containing tube was bubbled through the reaction mixture within the flask.

After completion of the reaction, the reaction mixture was centrifuged, and the supernatant was washed with dry pyridine, followed by filtration in a nitrogen atmosphere to give 850 ml of a filtrate containing perhydropolysilazane. When the solvent was removed from the filtrate (5 ml) by evaporation in vacuo, 0.102 g of resinous solid, perhydropolysilazane was obtained.

Gel permeation chromatography of the thus obtained polymer revealed that the polysilazane had a number-average molecular weight of 980. An infrared spectrum of this polymer (solvent: dry xylene; concentration of the perhydroolyslazane: 10.2 g/liter) indicated peaks at a wavenumber of 3350 ($cm^{-1}$)(apparent absorptivity coefficient $\epsilon = 0.557$ $g^{31\ 1}cm^{-1}$) and at 1175 $cm^{-1}$ based on NH, a peak at 2170 ($\epsilon = 3.14$) based on SiH, a broad peak at 1020–820 based on SiH and SiNSi. A $^1HNMR$ (proton nuclear magnetic resonance) spectrum of this polymer (60 MHz; solvent:$CDCl_3$; reference substance: TMS) indicated broad peaks at $\delta$ of 4.8 ,4.4 (br, SiH) and 1.5 (br, NH).

REFERENCE EXAMPLE 2

The reaction was conducted using the same apparatus used in Reference Example 1 as follows. In the four-necked flask shown in Reference Example 1, 450 ml of dry tetrahydrofuran was charged, and the flask was cooled in a dry ice-methanol bath. Then 46.2 g of dichlorosilane was added into the flask. Subsequently, with stirring and cooling in the bath, 44.2 g of anhydrous methylamine was bubbled as a mixture gas with nitrogen through the reaction mixture within the flask. After completion of the reaction, the reaction mixture was centrifuged and the supernatant was washed with dry tetrahydrofuran, followed by filtration in a nitrogen atmosphere to give 820 ml of a filtrate containing N-methylsilazane. When the solvent was removed from the filtrate by evaporation in vacuo, 8.4 g of viscous oil was obtained. Gel permeation chromatography of the N-methylsilazane revealed that the N-methylsilazane had a number-average molecular weight of 1100.

REFERENCE EXAMPLE 3

To a four-necked 1 liter flask equipped with a gas feed conduit, a mechanical stirrer and a Dewar condenser, an oxygen-free, dry nitrogen gas was fed to replace the air within the flask therewith. After charging 300 ml of dry dichloromethane and 24.3 g (0.211 mol) of methyldichlorosilane, the flask was cooled in an ice bath. Then, with stirring, 18.1 g (1.06 mol) of ammonia which had been passed successively through a sodium hydroxide-containing tube and an active carbon-containing tube was bubbled through the reaction mixture within the flask. After completion of the reaction, the reaction mixture was centrifuged and the supernatant was washed with dry dichloromethane, followed by filtration in a nitrogen atmosphere. When the solvent was removed from the filtrate by evaporation in vacuo, 8.81 g of colorless, transparent methyl(hydro)silazane was obtained. Gel permeation chromatography of the methyl(hydro)silazane revealed that the methyl(hydro)silazane had a number-average molecular weight of 380.

REFERENCE EXAMPLE 4

The reaction was conducted using the same apparatus used in Reference Example 1 as follows. In the four-necked flask shown in Reference Example 1, 500 ml of dry toluene was charged, and the flask was cooled in an ice bath. Then 52.1 g of phenyldichlorosilane was added into the flask. Subsequently, with stirring and cooling in the ice bath, 30.0 g of ammonia which had been passed successively through a sodium hydroxide-containing tube and an active carbon-containing tube was bubbled through the reaction mixture within the flask. After completion of the reaction, the reaction mixture was treated in the same manner as in Reference Example 1 to obtain 6.8 g of oily phenylpolysilazane. Gel permeation chromatography of the phenylpolysilazane revealed that the phenylpolysilazane had a number-average molecular weight of 380.

EXAMPLE 1

100 ml of a solution of the perhydropolysilazane obtained in Reference Example 1 in pyridine (concentration of perhydropolysilazane: 5.10 wt %) was charged in a 300-ml autoclave for reaction, and 4.0 cc (0.035 mol) of trimethyl borate was added thereto. The mixture was stirred for 3 hours at 160° C. in a closed system. A rise in pressure of 1.0 $kg/cm^2$ was observed after completion of the reaction. Gas chromatography of generated gas revealed that the gas was composed of hydrogen and methane. After cooling the reaction mixture to room temperature, 100 ml of dry xylene was added thereto. When the solvent was removed at a temperature of 50 to 70° C. and under a pressure of 3 to 5 mmHg, 5.45 g of white powder was obtained. This powder was soluble in organic solvents such as toluene, tetrahydrofuran and chloroform. Gel permeation chromatography of the polymer powder revealed that the polymer powder had a number-average molecular weight of 2100. IR spectrum of the polymer indicated peaks at wavenumbers ($cm^{-1}$) of 3350 and 1175 based on NH, a peak at 2170 based on SiH, a broad peak at 1020 to 820 based on SiH and SiNSi, peaks at 2960, 2940 and 2840 based on CH, a peak at 1090 based on SiO, and a broad peak at 1550 to 1300 based on BO. $^1HNMR$ spectrum ($CDCl_3$, TMS) of the polymer powder indicated peaks at $\delta$ 4.8 (br, $SiH_2$), 4.7 (br, $OSiH_2$), $\delta$ 4.4 br, $SiH_3$, 3.6 (br, $CH_3O$) and $\delta$ 1.4 (br, NH). The results of elemental analysis of the polymer were as follows by weight.

Elemental analysis (wt %): Si: 42.4, N: 25.9, C: 8.8, 0: 12.7, B: 7.0, H: 3.8.

EXAMPLE 2

100 ml of a solution of the methylpolysilazane obtained in Reference Example 2 in o-xylene (concentration of methylpolysilazane: 10.4 wt %) was charged in a 300-ml autoclave for reaction, and 17.3 g (0.283 mol) of boron trichloride was added thereto. The mixture was stirred for 3 hours at 20° C. in a closed system. A white precipitate formed was removed by filtration. When the solvent of the filtrate was removed under reduced pressure in the same manner as in Example 1, 8.2 g of colorless, transparent rubbery solid was obtained. Gel permeation chromatography of this product revealed that the product had a number-average molecular weight of 1440.

EXAMPLE 3

100 ml of a solution of the perhydropolysilazane obtained in Reference Example 1 in o-xylene (concentration of perhydropolysilazane: 5.84 wt %) was charged in a 300-ml autoclave for reaction, and 4.0 cc (0.0396 mol) of pyridine-boran complex was added thereto. The mixture was stirred for 3 hours at 80° C. in a closed system. A rise in pressure of 0.2 kg/cm² was observed after completion of the reaction. Gas chromatography of generated gas revealed that the gas was composed of hydrogen. When the solvent was removed in the same manner as in Example 1, 4.98 g of red solid was obtained. Gel permeation chromatography of the solid product revealed that the solid product had a number-average molecular weight of 170,000.

EXAMPLE 4

100 ml of a solution of the N methylsilazane obtained in Reference Example 2 in γ-picoline (concentration of N-methylsilazane: 4.95 wt %) was charged in a 300-ml autoclave for reaction, and 4.0 cc (0.0148 mol) of tributyl borate was added thereto. The mixture was stirred for 3 hours at 120° C. in a closed system. A rise in pressure of 0.8 kg/cm² was observed after completion of the reaction. The reaction mixture was cooled to room temperature. When the solvent was removed from the reaction mixture in the same manner as in Example 1 in vacuo, 5.03 g of pale yellow rubbery solid was obtained. Gel permeation chromatography of the solid product revealed that the solid product had a number-average molecular weight of 1880.

EXAMPLE 5

80 ml of a solution of the phenylpolysilazane obtained in Reference Example 4 in pyridine (concentration of phenylpolysilazane: 3.65 wt %) was charged in a 300-ml autoclave for reaction, and 1.26 g (0.0204 mol) of boric acid was added thereto. The mixture was stirred for 1 hour at 60° C. in a closed system. A rise in pressure of 0.6 kg/cm² was observed after completion of the reaction. The reaction mixture was cooled to room temperature. When the solvent was removed from the reaction mixture in the same manner as in Example 1 in vacuo, 2.46 g of white solid was obtained. Gel permeation chromatography of the solid product revealed that the solid product had a number-average molecular weight of 3.2040.

EXAMPLE 6

100 ml of a solution of the perhydropolysilazane obtained in Reference Example 1 in pyridine (concentration of perhydropolysilazane: 5.37 wt %) was charged in a 300-ml pressure vessel for reaction, and 3.2 ml (0.0376 mol) of 1,3,5-trimethylborazine was added thereto. The mixture was stirred for 3 hours at 120° C. in a closed system. A rise in pressure of 0.3 kg/cm² was observed after completion of the reaction. Gas chromatography of generated gas revealed that the gas was composed of hydrogen. The reaction mixture was cooled to room temperature. When the solvent was removed in vacuo in the same manner as in Example 1, 4.86 g of white powder was obtained. This powder was soluble in organic solvents such as toluene, tetrahydrofuran and chloroform. Gel permeation chromatography of the solid product revealed that the powder had a number-average molecular weight of 2430.

EXAMPLE 7

100 ml of a solution of the perhydropolysilazane obtained in Reference Example 1 in pyridine (concentration of perhydropolysilazane: 6.32 wt %) was charged in a 300-ml autoclave for reaction, and 5.5 ml (0.0379 mol) of trimethoxyboroxine was added thereto. The mixture was stirred for 3 hours at 140° C. in a closed system. A rise in pressure of 0.2 kg/cm² was observed after completion of the reaction. Gas chromatography of generated gas revealed that the gas was composed of hydrogen and methane. The reaction mixture was cooled to room temperature. When the solvent was removed in vacuo in the same manner as in Example 1, 5.77 g of white powder was obtained. This powder was soluble in organic solvents such as toluene, tetrahydrofuran and chloroform. Gel permeation chromatography of the solid product revealed that the powder had a number-average molecular weight of 1940.

EXAMPLE 8

The polyborosilazane obtained in Example 1 was pyrolyzed by heating in ammonia up to 1000° C. at a heating rate of 3° C./min to obtain white solid in a yield of 88.0 wt %. X-ray diffractiomen patterns of the thus obtained ceramic revealed that the ceramic was amorphous. Elemental analysis of this solid based on weight gave the following results.

Elemental analysis (wt %): Si: 40.7, N: 33.5, C: 1.57, 0: 12.0, B: 7.00.

Subsequently, the solid was further heated up to 1700° C. in a nitrogen atmosphere at a heating rate of 10° C./min to conduct calcination, thereby obtaining gray solid. X-ray diffraction patterns of this solid revealed that it remained amorphous as shown in FIG. 1.

EXAMPLE 9

The polyborosilazane obtained in Example 3 was pyrolyzed in an ammoniacal atmosphere up to 1000° C. at a heating rate of 3 ° C./min to obtain pale brown solid in a yield of 82.0 wt. % X-ray diffraction patterns of the thus obtained ceramic powder revealed that the ceramic was amorphous. Elemental analysis of this solid based on weight gave the following results.

Elemental analysis (wt %):

Si: 43.5, N: 38.7, C: 0.70, 0: 8.40, B: 5.60.

Subsequently, the solid was further heated up to 1500° C. in a nitrogen atmosphere at a heating rate of 10° C./min to conduct calcination, thereby obtaining blackish gray solid. X-ray diffractiometry of this solid revealed that it remained amorphous as shown in FIG. 2.

Then, this solid was still further heated up to 1700° C. in a nitrogen atmosphere at a heating rate of 10° C./min to conduct calcination, thereby obtaining blackish gray solid. X-ray diffractiometry of this solid indicated, as shown in FIG. 3, a (101) diffraction peak of γ-Si₃N₄ at $2\theta = 20.5°$, a (110) diffraction peak of $\gamma$-$Si_3N_4$ at
$2\theta = 22.9°$, a (200) diffraction peak of $\gamma$-$Si_3N_4$ at
$2\theta = 26.4°$, a (201) diffraction peak of $\gamma$-$Si_3N_4$ at
$2\theta = 30.9$, a (002) diffraction peak of $\gamma$-$Si_3N_4$ at
$2\theta = 31.7°$, a (102) diffraction peak of $\gamma$-$Si_3N_4$ at
$2\theta = 34.5°$, a (210) diffraction peak of $\gamma$-$Si_3N_4$ at
$2\theta = 35.2°$, a (211) diffraction peak of $\gamma$-$Si_3N_4$ at
$2\theta = 38.8°$, a (112) diffraction peak of $\gamma$-$Si_3N_4$ at
$2\theta = 39.4°$, a (300) diffraction peak of $\gamma$-$Si_3N_4$ at
$2\theta = 40.°$, a (202) diffraction peak of $\gamma$-$Si_3N_4$ at
$2\theta = 41.8°$, a (301) diffraction peak of $\gamma$-$Si_3N_4$ at
$2\theta = 43.4°$, a (220) diffraction peak of $\gamma$-$Si_3N_4$ at
$2\theta = 46.9°$, a (212) diffraction peak of $\gamma$-$Si_3N_4$ at
$2\theta = 48.2°$, a (212) diffraction peak of $\beta$-$Si_3N_4$ at
$2\theta = 23.3°$, a (200) diffraction peak of $\beta$-$Si_3N_4$ at
$2\theta = 26.9°$, a (101) diffraction peak of $\beta$-$Si_3N_4$ at
$2\theta = 33.6°$, a (210) diffraction peak of $\beta$-$Si_3N_4$ at
$2\theta = 36.0°$, a (201) diffraction peak of $\beta$-$Si_3N_4$ at
$2\theta = 41.4°$, and a (310) diffraction peak of $\beta$-$Si_3N_4$ at
$2\theta = 49.9°$, thus the solid product being found to be crystalline silicon nitride.

COMPARATIVE EXAMPLE 1

To a four-necked 100 ml flask equipped with a condenser, a seal cap, a thermometer and a magnetic stirrer, a dry nitrogen gas was fed to replace the air within the flask therewith. After charging 63.4 g of a solution in benzene of perhydropolysilazane obtained in Reference Example 1 (concentration of the perhydropolysilazane: 4.45 wt %), a solution of 4.00 g (12.2 mmol) of zirconium tetraisopropoxide in 6.0 ml of dry benzene was fed to the flask using a syringe with stirring, followed by refluxing the resulting solution to react. After completion of the reaction, the reaction solution was subjected to gel pertition chromatography to obtain pale yellow solid polyhydrozirconosilazane. Cryoscopic method (solvent: dry benzene) revealed that the thus obtained polymer had a number-average molecular weight of 2100. Elemental analysis of the polymer revealed that the polymer had a formulation of Si: 34.0, Zr: 18.6, N: 13.0, 0: 13.2, C: 14.4 and H: 5.1 (wt %). When the thus obtained polymer was calcined at 1350° C. in a nitrogen atmosphere, a black solid was obtained in a yield of 78 wt %. X-ray diffractiometry of this solid indicated a diffraction pattern of amorphous $ZrO_2$ phase as shown in FIG. 4. Calcination of perhydropolysilazane under the same conditions was confirmed to produce silicon nitride crystalline in view of X-ray diffractiometry, whereas calcination of polyhydrozirconosilazane involved generation of amorphous $ZrO_2$ phase which served to keep the amorphous state of the silicon nitride to a higher temperature level.

COMPARATIVE EXAMPLE 2

To a four-necked 200 ml flask equipped with a condenser, a seal cap, a thermometer and a magnetic stirrer, a dry nitrogen gas was fed to replace the air within the flask therewith. After charging 110 g of a solution in benzene of perhydropolysilazane obtained in Reference Example 1 [concentration of the perhydropolysilazane: 4.57 wt %), a solution of 6.30 g (22.2 mmol) of titanium tetraisopropoxide in 6.5 ml of dry benzene was fed to the flask using a syringe with stirring. Color of the reaction solution was changed from colorless to pale brown, pale brown to violet, and violet to black. After completion of the reaction, the solvent was removed in vacuo to obtain dark brown solid polyhydrotitanosilazane in a yield of 84 wt %. Cryoscopic method (solvent: dry benzene) revealed that the thus obtained polymer had a number-average molecular weight of 1840. The thus obtained polymer was not a mere mixture of perphydropolysilazane and titanium alkoxide but was a condensation reaction product between the two materials which had therefore a higher molecular weight than the two. Elemental analysis of the resulting polymer revealed that the polymer had a formulation of Si: 33.0, Ti: 9.8, N: 14.0, 0: 11.8, C: 23.4 and H: 6.6 (wt %). When the thus obtained polymer was calcined at 1350 C for one hour in a nitrogen atmosphere, a black solid was obtained in a yield of 728 wt %. X-ray diffractiometry of this solid indicated a diffraction pattern of amorphous TiN phase alone as shown in FIG. 5. Calcination of perhydropolysilazane under the same conditions was confirmed to produce silicon nitride crystalline in view of X-ray diffractiometry, whereas calcination of polyhydrotitanosilazane involved generation of amorphous TiN phase which served to keep the amorphous state of the silicon nitride to a higher temperature level. Elemental analysis of the thus obtained ceramic gave the following results (wt %) Si: 41.3, Ti: 12.9, N: 20.5, 0: 19.9, C: 4.5.

COMPARATIVE EXAMPLE 3

120 ml of a solution of the perhydropolysilazane obtained in Reference Example 1 in pyridine concentration of perhydropolysilazane: 5.25 wt %) was charged in a 300-ml pressure vessel for reaction, and 13.0 g (0.0637 mol) of aluminum triisopropoxide was added thereto. The mixture was stirred for 3 hours at 1240° C. in a closed system. A rise in pressure of 1.8 kg/cm² was observed after completion of the reaction. The reaction mixture was cooled to room temperature. When the solvent was removed in vacuo in the same manner as in Example 1, 12.3 g of pale yellow powder was obtained. The thus obtained polymer was heated up to 1500° C. in a nitrogen atmosphere at a temperature-increasing rate of 10° C./min, thereby obtaining grayish white solid. X-ray diffractiometry of this solid indicated a 100) diffraction peak of $\beta$-Sialon at $2\theta = 13.3°$, a (110) diffraction peak of $\beta$-Sialon at $2\theta = 23.1$, a (200) diffraction peak of $\beta$-Sialon at $2\theta = 26.8°$, a (101) diffraction peak of $\beta$-Sialon at $2\theta = 33.2°$, a (210) diffraction peak of $\beta$-Sialon at $2\theta = 35.8°$, a (111) diffraction peak of $\beta$-Sialon at $2\theta = 38.4°$, a (201) diffraction peak of $\beta$-Sialon at $2\theta = 40.8°$, (220) and (211) diffraction peaks of $\beta$-Sialon at $2\theta = 47.5°$, a (310) diffraction peak of $\beta$-Sialon at $2\theta = 49.5°$, a (301) diffraction peak of $\beta$-Sialon at $2\theta = 51.6°$, a (221) diffraction peak of $\beta$-Sialon at $2\theta = 57.2°$, a (311) diffraction peak of $\beta$-Sialon at $2\theta = 59.1°$, thus the solid product being found to be crystalline $\beta$-Sialon.

Elemental analysis of the thus obtained ceramic gave the following results (wt %) Si: 38.9, N: 25.8, Al: 21.9, C: 3.2, 0: 12.3.

EXAMPLE 10

100 ml of a solution of the perhydropolysilazane obtained in Reference Example 1 in o-xylene (concentration of perhydropolysilazane: 4.53 wt %) was charged in a 300 ml autoclave for reaction, and 3.34 g (0.044 mol) of boranedimethylsulfide complex was slowly added thereto. The mixture was stirred for 3 hours at 20° C. in a closed system. A rise in pressure of 1.2 kg/cm² was observed after completion of the reaction. Gas chromatography revealed that the generated gas was hydrogen. When the solvent was removed at a temperature of 50° to 70 °C. under a pressure of 3 to 5 mmHg, 4.15 g of white powder was obtained. This powder was soluble in organic solvents such as toluene, tetrahydrofuran and chloroform. Gel permeation chromatography of the polymer powder revealed that the polymer powder had a number-average molecular weight of 4400. IR spectrum of the polymer indicated peaks at wavenumbers (cm$^{-1}$) of 3350 and 1175 based on NH, a peak at 2170 based on SiH, a broad peak at 1020 to 820 based on SiH and SiNSi and a peak at 1550 to 1300 based on BN. Proton NMR spectrum (CDCl$_3$, TMS) of the polymer powder indicated peaks at 4.8 (br, SiH$_2$), 4.4 (br, SiH$_3$) and 1.4 (br, NH).

The polymer powder was then gradually heated to 1000 °C. in ammonia at a heating rate of 5 °C./min to effect pyrolysis, thereby obtaining gray solids with a yield of 83.0 wt %. Powder X-ray diffraction patterns of the thus obtained ceramic revealed that the ceramic was amorphous. This ceramic powder was further heated up to 1700 °C. in a nitrogen atmosphere at a heating rate of 10 °C./min for calcination, thereby obtaining dark gray solids which were found to be amorphous upon analysis by powder X-ray diffraction patterns.

Elemental analysis (wt %): Si: 47.5, N: 36.8, C: 1.30, 0: 2.23, B: 11.4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A polyborosilazane having a boron/silicon atomic ratio of 0.01 to 3 and a number-average molecular weight of about 200 to 500,000 and containing (a) skeletal groups of a recurring unit represented by the general formula:

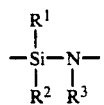

wherein R$^1$, R$^2$ and R$^3$, independently from each other, represent hydrogen, a hydrocarbyl group, a group other than the hydrocarbyl group and containing a carbon atom bonded to the silicon atom of the above general formula, an alkylsilyl group, an alkylamino group or an alkoxy group, with the proviso that at least one of R$^1$, R$^2$ and R$^3$ is hydrogen and (b) at least one cross-linkage which cross-links said skeletal groups and which is selected from the group consisting of:

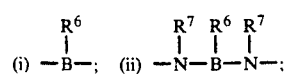

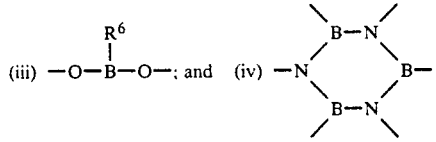

wherein R$^4$ represents hydrogen, halogen, an alkyl group, an alkenyl group, a cycloalkyl group, an aryl group, an alkoxy group, an alkylamino group, a hydroxyl group or an amino group and R$^7$ represents a residue bound to the nitrogen atom of R$^6$ having a nitrogen atom, and wherein at least two of the six bonds of the group (iv) are used for the crosslinkage with the remaining bond or bonds, if any, being linked to hydrogen, halogen, an alkyl group, an alkenyl group, a cycloalkyl group, an aryl group, an alkoxy group, an alkylamino group, a hydroxyl group or an amino group.

2. A process for producing a polyborosilazane having a boron/silicon atomic ratio of 0.01 to 3 and a number-average molecular weight of about 500 to 500,000, which comprises reacting a polysilazane having a number-average molecular weight of about 250 to about 50,000 and containing a skeletal structure of a recurring unit represented by the general formula (I):

wherein R$^1$, R$^2$ and R$^3$, independently from each other, represent hydrogen, a hydrocarbyl group, a group other than the hydrocarbyl group and containing a carbon atom bonded to the silicon atom of the above general formula, an alkylsilyl group, an alkylamino group or an alkoxy group, with the proviso that at least one of R$^1$, R$^2$ and R$^3$ is hydrogen, with a boron compound represented by the following general formula (II), (III), (IV) or (V):

wherein R$^4$ may be the same or different and represents hydrogen, halogen, an alkyl group, an alkenyl group, a cycloalkyl group, an aryl group, an alkoxy group, an alkylamino group, a hydroxy group or an amino group, and L represents a compound capable of forming a complex with B(R$^4$)$_3$.

3. A polyborosilazane obtained by the process according to claim 2.

4. The process of claim 2 wherein chains of said skeletal structure are crosslinked by reaction with said boron compound.

5. The process of claim 2 wherein said polyborosilazane has a number-average molecular weight of 800–200,000 and said polysilazane has a number-average molecular weight of 500–10,000.

* * * * *

UNITED STATES PATENT AND TRADEMARK OFFICE
CERTIFICATE OF CORRECTION

PATENT NO. : 5,030,744

DATED : July 9, 1991

INVENTOR(S) : FUNAYAMA et al

It is certified that error appears in the above-identified patent and that said Letters Patent is hereby corrected as shown below:

On the Title Page, Item [56]:

Under "References Cited", "U.S. 4,581,968" should read --U.S. 4,581,468--.

Col. 1, line 64, after "$R^7$" delete the comma ",".

Col. 5, line 44, "$BH_n(R^r)_{3-n}$" should read --$BH_n(R^4)_{3-n}$--.

Col. 6, line 54, "$Bx_n(R^4)_{3-n}$" should read --$BX_n(R^4)_{3-n}$--.

Col. 8, line 3, "epolysila-" should read --polysila--.

Col. 10, the formula shown at lines 26-32 which reads:

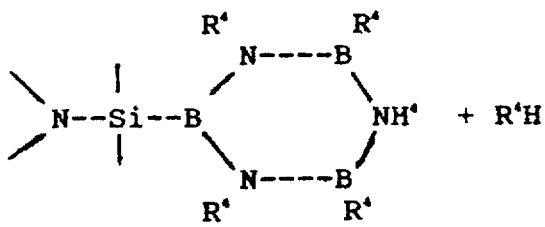

UNITED STATES PATENT AND TRADEMARK OFFICE
CERTIFICATE OF CORRECTION

PATENT NO. : 5,030,744
DATED : July 9, 1991
INVENTOR(S) : FUNAYAMA et al

It is certified that error appears in the above-identified patent and that said Letters Patent is hereby corrected as shown below:

should read:

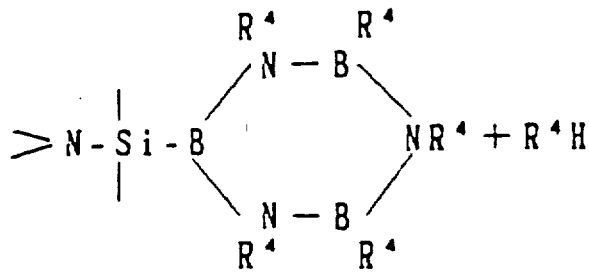

Col. 10, line 59, "$R^4$" should read --$R^4H$--.

Col. 12, the formula at lines 28-37 which reads:

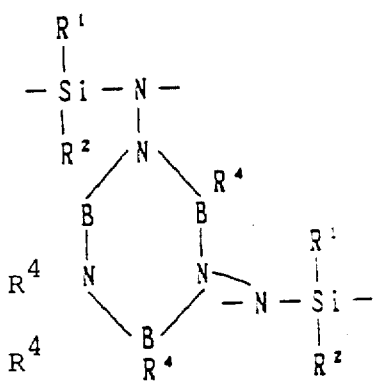 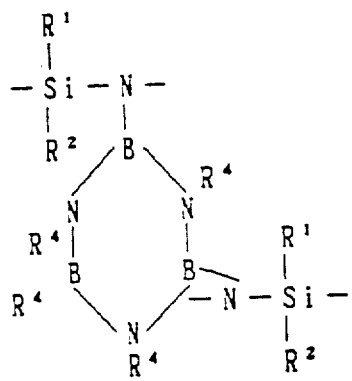

UNITED STATES PATENT AND TRADEMARK OFFICE
CERTIFICATE OF CORRECTION

PATENT NO. : 5,030,744
DATED : July 9, 1991
INVENTOR(S) : FUNAYAMA et al

It is certified that error appears in the above-identified patent and that said Letters Patent is hereby corrected as shown below:

should read:

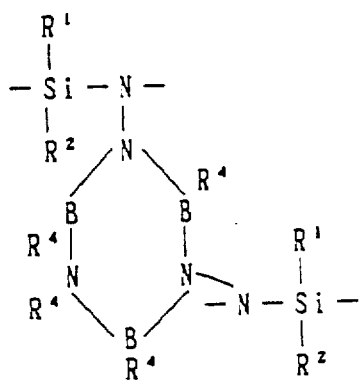 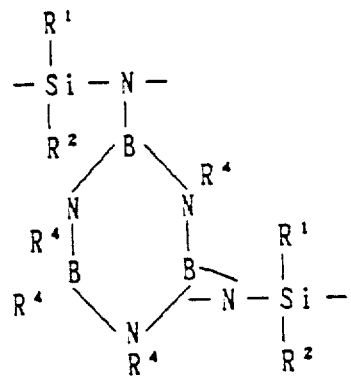

UNITED STATES PATENT AND TRADEMARK OFFICE
CERTIFICATE OF CORRECTION

PATENT NO. : 5,030,744
DATED : July 9, 1991
INVENTOR(S) : FUNAYAMA et al

It is certified that error appears in the above-identified patent and that said Letters Patent is hereby corrected as shown below:

Col. 12, the formula at lines 38-49 which reads:

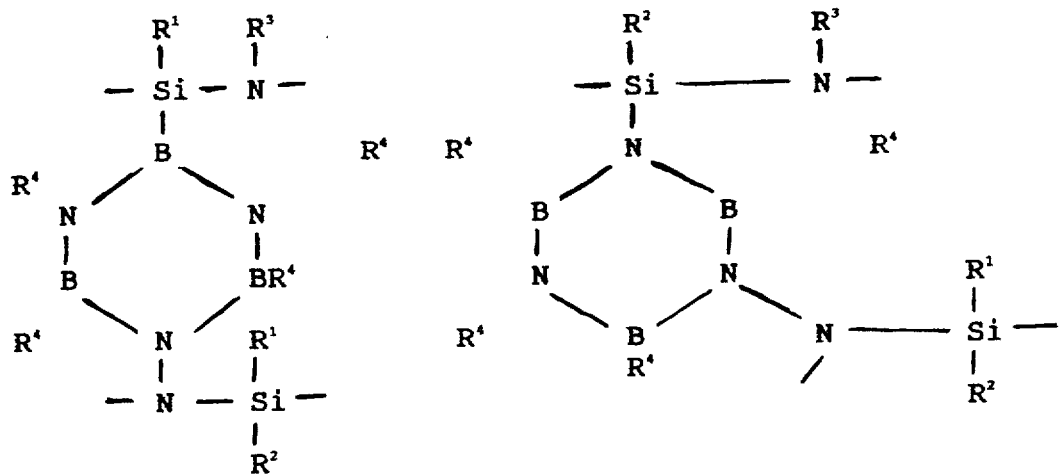

UNITED STATES PATENT AND TRADEMARK OFFICE
CERTIFICATE OF CORRECTION

PATENT NO. : 5,030,744
DATED : July 9, 1991
INVENTOR(S) : FUNAYAMA et al

It is certified that error appears in the above-identified patent and that said Letters Patent is hereby corrected as shown below:

should read:

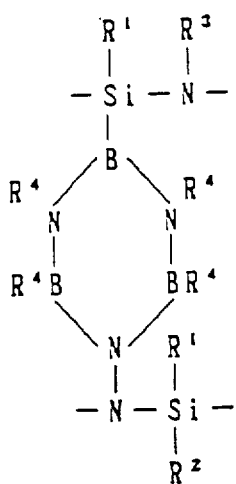 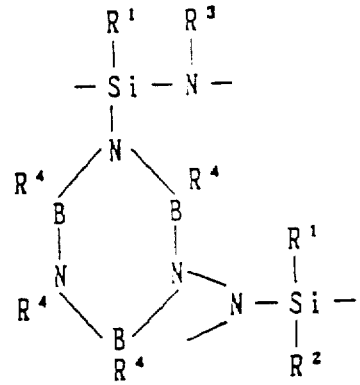

Col. 13, line 31, after "group", second instance, insert a comma --,--.

Col. 14, line 3, "25." should read --25,--;

line 20, delete "21" and insert -- < --;

line 22, "R$^1$is" insert --R$^1$ is--;

line 57, insert --(m,n: positive integers).

Col. 16, line 68, "3-bromo-7-methyl13-borabicy-" should read

UNITED STATES PATENT AND TRADEMARK OFFICE
CERTIFICATE OF CORRECTION

PATENT NO. : 5,030,744

DATED : July 9, 1991

INVENTOR(S) : FUNAYAMA et al

It is certified that error appears in the above-identified patent and that said Letters Patent is hereby corrected as shown below:

--3-bromo-7-methyl-3-borabicy- --.

Col. 17, line 16, "(1,1,2trimethylpropyl)borane" should read --(1,1,2--trimethylpropyl)borane--;

line 20, "chlorooctyl(1,1,2trime-" should read --chlorooctyl(1,1,2-trime- --;

line 42, "methoxybis(2methylpropyl)borane," should read --methoxybis(2-methylpropyl)borane--;

line 59, "tris(3methyl-" should read --tris(3-methyl--;

line 67, "methyl1,2-butadienyl)borane" should read --methyl-1,2-butadienyl)borane--.

Col. 18, line 4, "2-butenyl bis(dimethylamino)bo-" should read --2-butenylbis(dimethylamino)bo- --;

line 5, "tri(2propenyloxy)borane" should read --tri(2-propenyloxy)borane--;

UNITED STATES PATENT AND TRADEMARK OFFICE
CERTIFICATE OF CORRECTION

PATENT NO. : 5,030,744
DATED : July 9, 1991
INVENTOR(S) : FUNAYAMA et al

It is certified that error appears in the above-identified patent and that said Letters Patent is hereby corrected as shown below:

line 10, "2propenyl)dipropylborane" should read --2-propenyl)dipropylborane--;

line 15, "tris(2-methyl-2propenyl)borane" should read --tris(2-methyl-2-propenyl)borane--;

line 17, "thylpropyl)(2phenylethenyl)borane" should read --thylpropyl)(2-phenylethenyl)borane--;

line 31, "bis(dimethylamino)-1pyrrolylborane" should read --bis(dimethylamino)-1-pyrrolylborane--;

line 35, "dibutyl(diethylamine)borane" should read --dibutyl(diethylamino)borane--;

line 47, "dihydroxy(1naph-" should read --dihydroxy(1-naph- --; and line 56, "bis(3-methyl-2butyl)borane" should read --bis(3-methyl-2-butyl)borane--.

Col. 19, line 22, "2,4,6trifluoroborazine" should read --2,4,6-trifluoroborazine--;

UNITED STATES PATENT AND TRADEMARK OFFICE
CERTIFICATE OF CORRECTION

PATENT NO. : 5,030,744
DATED : July 9, 1991
INVENTOR(S) : FUNAYAMA et al

It is certified that error appears in the above-identified patent and that said Letters Patent is hereby corrected as shown below:

line 23, "trichloro1,3,5-trimethylborazine" should read --trichloro-1,3,5-trimethylborazine--;

line 27, "2,4,6-trichloro1,3,5-triethylborazine" should read --2,4,6-trichloro-1,3,5-triethylborazine--;

line 38, "boranehydrazine" should read --borane-hydrazine--;

line 51, "trichloroboranetrime-" should read --trichloroborane-trime--;

line 53, "fluoro-borane-trimethylamine" should read --fluoroborane-trimethylamine--;

line 54, tri-iodoborane-trimethylphosphine" should read --triiodoborane-trimethylphosphine--;

line 55, "di-fluoroborane-trime-" should read --difluoroborane-trime- --;

line 61 "boranetrimethylphosphine" should read --borane-trimethylphosphine--;

line 68, "bromomethylboranetrimethylphosphine"

UNITED STATES PATENT AND TRADEMARK OFFICE
CERTIFICATE OF CORRECTION

PATENT NO. : 5,030,744
DATED : July 9, 1991
INVENTOR(S) : FUNAYAMA et al

It is certified that error appears in the above-identified patent and that said Letters Patent is hereby corrected as shown below:

should read --bromomethylborane-trimethylphosphine--.

Col. 20, line 3, "boranepyridine" should read --borane-pyridine--;

line 4, "bromodimethylboranetrimethylphos-" should read --bromodimethylborane-trimethylphos- --;

line 12, "fluoroboranemethoxybenzene" should read --fluoroborane-methoxybenzene--;

line 15, "tribromoboranetriphenylphosphine" should read --tribromoborane-triphenylphosphine--;

line 27, "1,2dicarbapen-" should read --1,2-dicarbapen- --; and

Col. 23, line 34, "g$^{11}$ $^1$" should read --g$^{-1}$--.

Col. 24, line 59, "4.7" should read --δ4.7--; and line 60, "3.6" should read --δ3.6--.

UNITED STATES PATENT AND TRADEMARK OFFICE
CERTIFICATE OF CORRECTION

PATENT NO. : 5,030,744

DATED : July 9, 1991

INVENTOR(S) : FUNAYAMA et al

It is certified that error appears in the above-identified patent and that said Letters Patent is hereby corrected as shown below:

Col. 27, line 10, "$2\theta = 40.°,$" should read --$2\theta = 40.1°,$--.

Col. 28, line 10, "1350 C" should read --1350°C--;

line 27, "concentra-" should read --(concentra- --;

line 40, "100)" should read --(100)--.

Col. 30, line 10, "$R^4$" should read --$R^6$--.

Signed and Sealed this

Twenty-first Day of June, 1994

Attest:

BRUCE LEHMAN

*Attesting Officer*    *Commissioner of Patents and Trademarks*